United States Patent [19]
Okawara et al.

[11] Patent Number: 5,317,678
[45] Date of Patent: May 31, 1994

[54] METHOD FOR CHANGING COLOR OF DISPLAYED IMAGES BY USE OF COLOR COMPONENTS

[75] Inventors: Hiroyuki Okawara, Tokyo; Makoto Kato, Kawasaki; Shinichiro Miyaoka, Kawasaki; Makoto Nohmi, Kawasaki; Yuri Takizawa, Machida, all of Japan

[73] Assignee: Hitachi, Ltd., Tokyo, Japan

[21] Appl. No.: 493,447

[22] Filed: Mar. 14, 1990

[30] Foreign Application Priority Data

Mar. 15, 1989 [JP] Japan ................................ 1-60976
Jul. 10, 1989 [JP] Japan ................................ 1-175463

[51] Int. Cl.[5] .................... G06F 15/62; G06F 15/72
[52] U.S. Cl. .................................... 395/126; 395/131; 395/130
[58] Field of Search ............ 395/126, 131, 129, 130; 358/80, 75, 518, 523, 504; 340/703; 345/154, 153, 150

[56] References Cited

U.S. PATENT DOCUMENTS

| | | | |
|---|---|---|---|
| 4,349,279 | 9/1982 | Jung .................................. | 358/80 X |
| 4,488,245 | 12/1984 | Dalke et al. ....................... | 358/80 X |
| 4,685,071 | 8/1987 | Lee .................................... | 358/80 X |
| 4,843,458 | 6/1989 | Ho ..................................... | 358/80 |
| 5,051,928 | 9/1991 | Gruters ............................. | 395/131 |
| 5,058,040 | 10/1991 | Tajima ............................... | 395/131 |

FOREIGN PATENT DOCUMENTS

63-237172 10/1988 Japan .

OTHER PUBLICATIONS

Fukue, lecture for Japanese Photo Survey Association, Oct. 1986, pp. 63-68 (no translation).
O plus E No. 110, *Full Color Image Processor SHAIP and Its Application*, Jan. 1989 (no translation), pp. 131-142.
G. J. Klinker, International Journal of Computer Vision No. 1, vol. 2 (1988.6), pp. 7-32.

*Primary Examiner*—Raymond J. Bayerl
*Attorney, Agent, or Firm*—Fay, Sharpe, Beall, Fagan, Minnich & McKee

[57] ABSTRACT

In order to accomplish a color adjustment capable of determining a color at a high degree of freedom, a variety of color expressions and corresponding input instructions are correlated to reflect the instruction of a color change by a certain expression upon another expression. In order to accomplish a color change considering the changes in the ambience, moreover, each vector of an object color, a light source color, a color texture, an ambient color and an input bias is decided to determine the separated component values of the former three vectors of a picture element value so that the changed color of the picture element value may be determined after the vector change from the separated component values and the changed vectors.

50 Claims, 21 Drawing Sheets

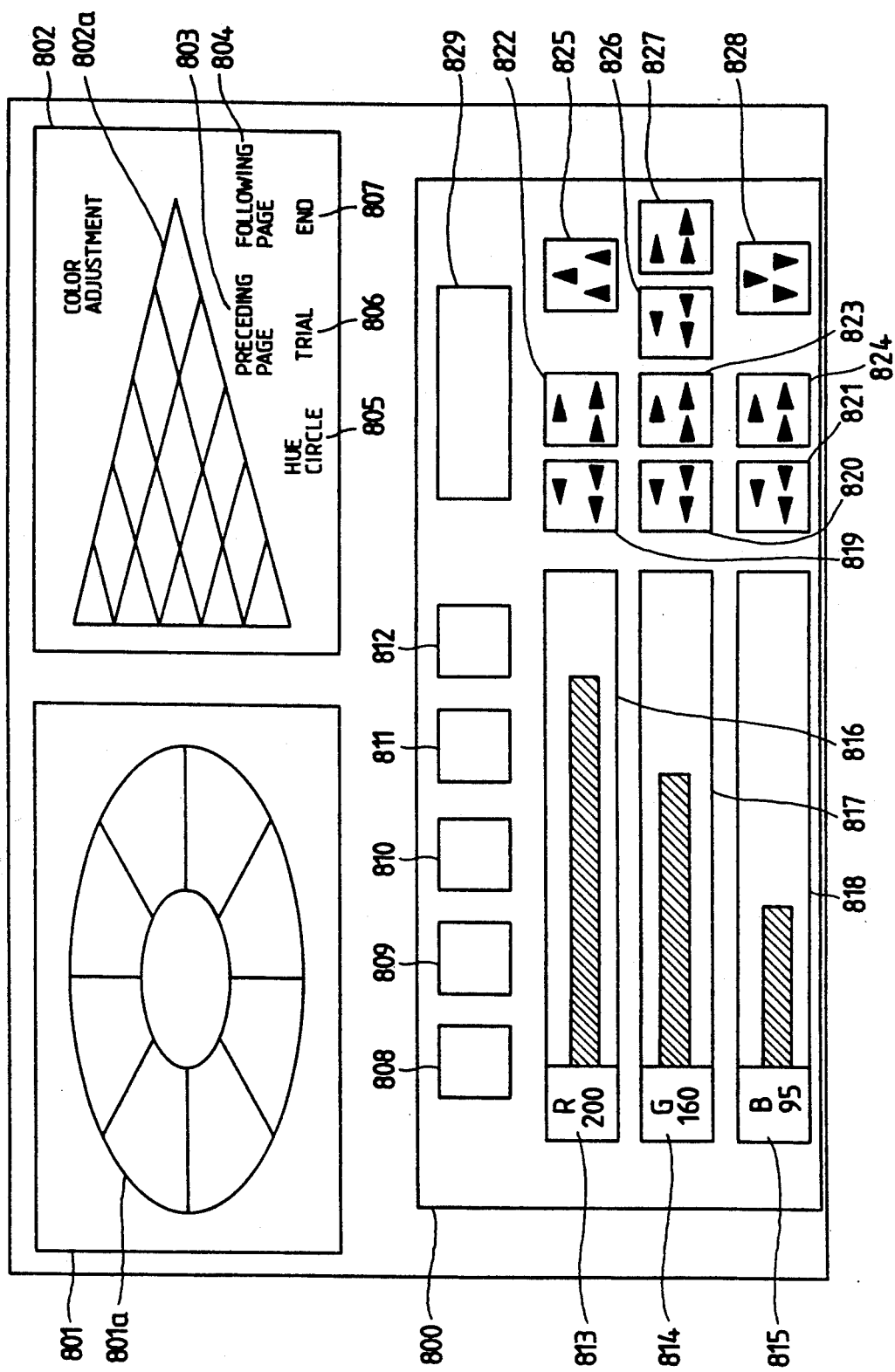

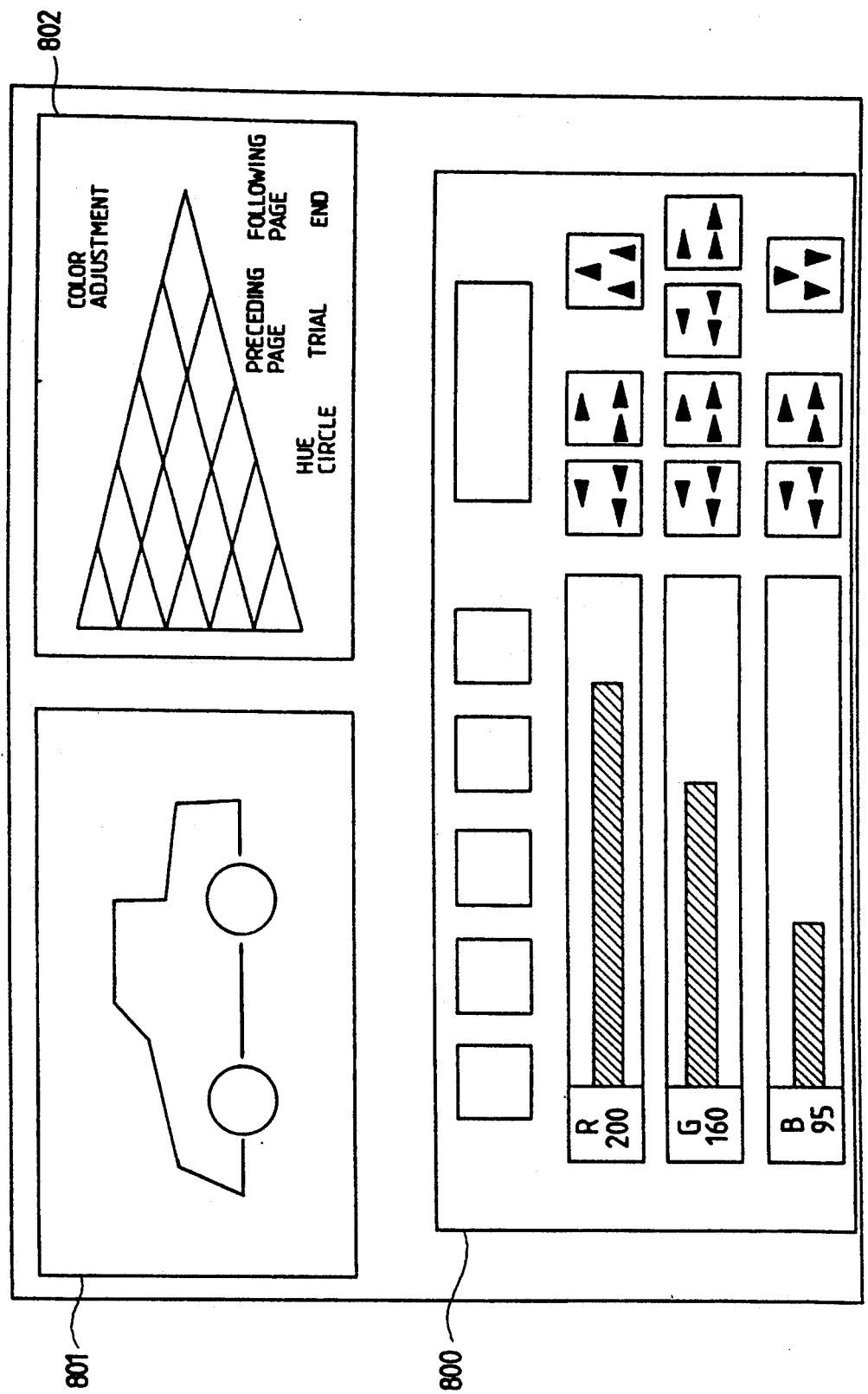

801a

802a

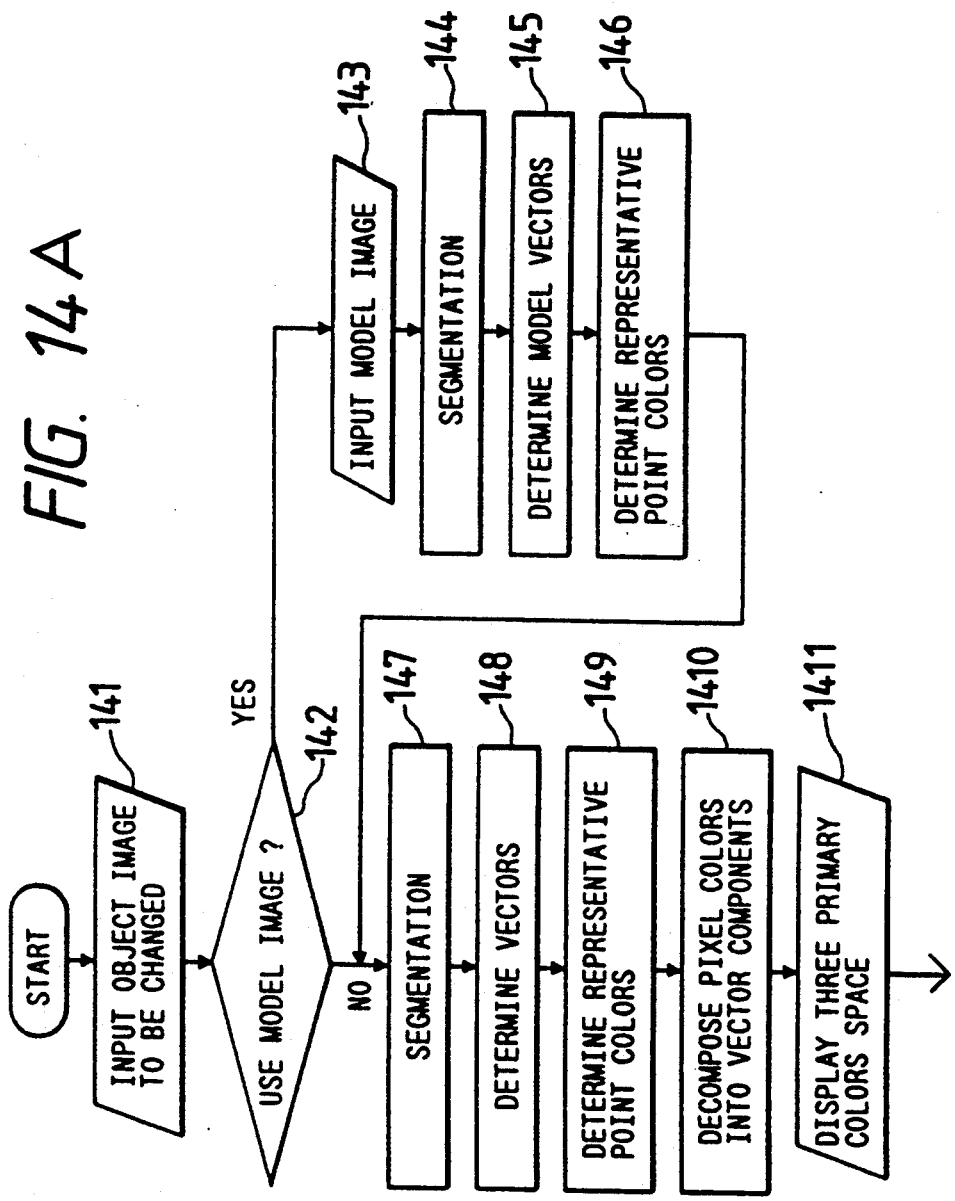

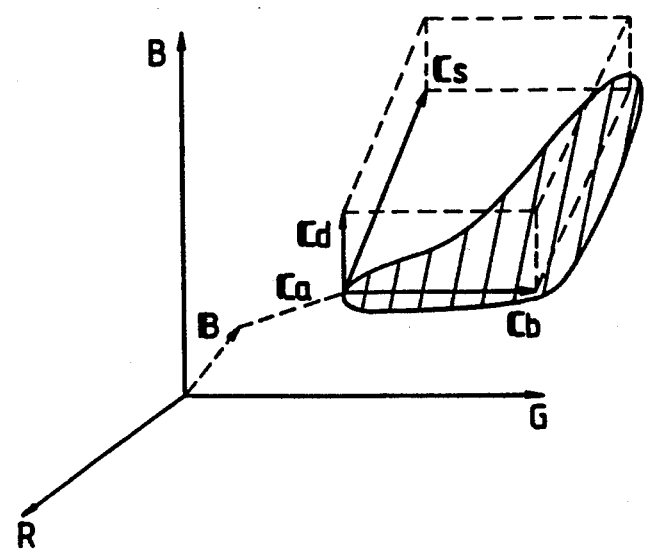
FIG. 22
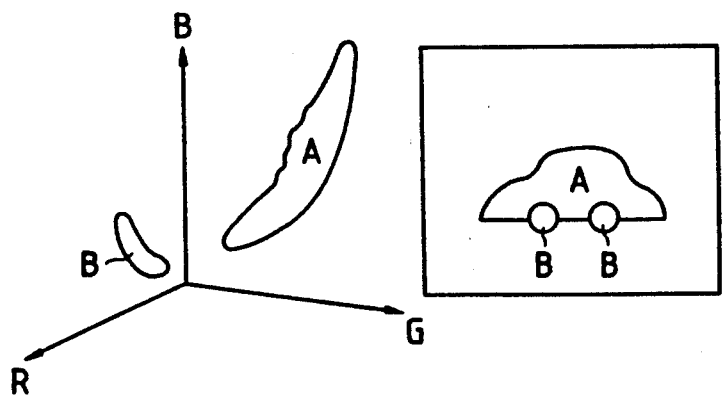
FIG. 24
FIG. 25 (PRIOR ART)
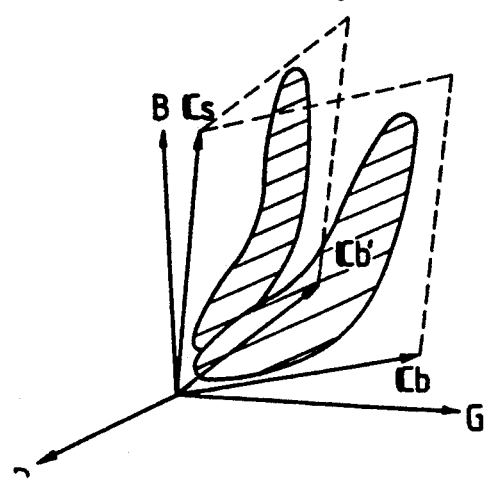

METHOD FOR CHANGING COLOR OF DISPLAYED IMAGES BY USE OF COLOR COMPONENTS

BACKGROUND OF THE INVENTION

The present invention relates to a color adjusting method to be implemented in a computer equipped with a full-color display and, more particularly, to a color changing method which is suited for sales presentations of commodities, appearance simulations of buildings or color designs for industrial products by using a function for simulating the changes in the object colors of natural images due to ambient changes such as the weather of the actual world or the time or changes in the object colors in an identical ambience.

When a color image is to be displayed in a full-color CRT by the color adjusting method of the prior art, the display colors are determined to indicate the three primary color components, i.e., red (R), green (G) and blue (B) colors. In the prior art, the values of the RGB are sometimes inputted manually and directly by the operator, but it is difficult for the operator to discriminate the correspondences between the RGB components and the actual color. In the full-color natural image editor (which is known under the trade name of "CANVAS") of ADS Corporation, for example, there are used as the expression of the color not only the RGB components but also the hue (H), saturation (S) and value (V) of the color, and a sample color set is prepared for selections so that the color may be adjusted as if it were mixed on the palette of paints.

The method of the prior art for changing the colors of a color image is exemplified by either a color change (i.e., the characteristic evaluations of a variety of HIS color models according to the lecture of Japanese Photo Survey Association made by Fukue in October, 1986, which will be referred to as "Reference 1") by HSV, HSI or HSL level or a color change (i.e., O plus E No. 110, Full Color Image Processor SHAIP and Its Application made in January, 1989, which will be referred to as "Reference 2") for setting the color conversion by using a look-up table.

The method of changing the colors of the picture element values of a color image in the three-dimensional three-primary color space having plotted the picture element values is exemplified by the method (which will be referred to as "Reference 3") of changing the colors of the individual picture elements by presuming a plurality of color vector in the three-primary color space to determine the separated components of the color vector of the plotted individual picture element values and by changing the color vector thereby to use both separated components and the changed color vector like the present invention in Japanese Patent Laid-Open No. 63-237172.

According to this method, as shown in FIG. 25, in the three-dimensional color space, the three primary color components of the individual picture elements in a target color region of a color image are assumed be located in a plane which is composed of a black (i.e., origin), an object color vector Cb and a source color vector Cs. With this assumption, the individual picture elements are separated into the components of the above-specified two vectors and are used as the intermediate coordinates of the two-dimensional individual picture elements, and the color region is then changed into a desired color by calculating the changed three primary color components from the intermediate coordinate values, the light source color vector Cs and a second object color vector Cb' newly obtained. So long as the aforementioned assumption holds, this method is enabled by separating the light source color and the object color to change the object color of an image having a reflection although this has been difficult according to the preceding color changing methods. Since the reflected light appears as a component for the light source color vector of each picture element value in the three-primary color space whereas the remaining lights appear as the components for the object color vector, the color of the image having the reflection can be changed by changing the object color vector.

Although not the process for changing the color of an object, there is another color image processing method (as disclosed in International Journal of Computer Vision No. 1, Vol. 2 (1988.6) by G. J. Klinker, which will be referred to as "Reference 4") using the separated components of the color vector of each picture element value plotted by presuming a plurality of color vectors. In this Reference 4, G. J. Klinker et al. have accomplished the following examinations: ①Under such a special photographic circumstances in which only one point source exerts influences as a light source for an object, a colored glossy object (made of plastics) is photographed by a CCD camera. Then, the experiments are accomplished by analyzing the three-primary color space plotted with the picture element values of the color image obtained. ② In accordance with the distribution of the picture element values, the object color vector and the light source color vector are extracted from the dense state of the picture element values. This method has determined that the individual picture element values of a common object region are distributed inside of and in the vicinity of the parallelogram defined by the aforementioned two vectors. ③ G. J. Klinker et al. have proposed that, in case the individual picture elements value in the common object region are approximated as the points in the parallelogram of the two vectors, their positions in the parallelogram are characteristic values depending upon only the positions of the picture elements in the object region. ④ Thus, they have succeeded in eliminating the highlight components from the color image by separating the individual picture element values of the common object region into the aforementioned two vector components to eliminate the specular reflection components (i.e., the source color vector components).

However, the prior art thus far described has the following problems:

(1) In the color adjusting case: There is considerable gap between the numerical values of the color data and the adjusted actual color no matter which of the RGB or HSV might be used for expressions. Certain devices have been known in the prior art for facilitating the correspondence with the perceived color not by inputting the numerical values of the RGB or HSV but by inputting the coordinates in the region in which certain characteristic amounts smoothly change in dependence upon the positions. However, the color mixing belongs to the additive color mixing (in which the three primary colors are mixed into white) and is different from the familiar color mixing of pigments, i.e., the substractive color mixing (in which the three primary colors are mixed into black). This mixing makes it remarkably difficult to adjust a desired color merely by instructing and synthesizing the components.

Certain methods of the prior art present sample colors. Since all of these sample colors are to be displayed one time, the intrinsic three-dimensional structure of the RGB is confined in the two dimensions so that the order of the sample colors is not natural. Moreover, the number of the sample colors is short for reminding the number (0 to 255 for each of the RGB, i.e., 16,770,000) to be displayed on the CRT.

In case, on the other hand, the aforementioned color adjusting method is used for the color changing simulations, the color obtained as a result of the adjustment is used merely on the spot but may have to be stored for another use if an excellent color is adjusted. In this case, moreover, conveniences are not obtained unless a brief description is attached to the color.

The color changing simulations have a problem that calculations are extensive and take a long time.

(2) In the color changing case: In the prior art, the method of the Reference 3 is superior to the other methods of the prior art in the naturality of the color changes but has the following problems:

The first problem is that the method is insufficient for applications to a general color image. The method of the Reference 3 has assumed that the three primary color components of the individual picture elements in a target color region are located on the plane, which is defined by the black color, the object color vector and the light source color vector, in the three-primary color space. This assumption has been made on the image which is taken under remarkably special circumstances. This assumption can be applied to the image, which has been objected by using a circuit for changing the color of an image inputted by a scanner or a color camera in accordance with the shadow obtained by a TV (monochromatic) camera, but not to a general image. In the general color image, the color of an object region in an image is not exhibited only by the influences of the color and amount of a main light source, but the color obtained by the influences of the light (e.g., blue light) of a substance (e.g., sky) existing around the object is also added to the color of the object. When the image is to be photographed or inputted by an image input device, its characteristic color is added to the real color. In the three-primary color space having plotted the picture element values, the linear summation of the color due to the influence of a light, which is emitted from a substance existing around the aforementioned object, and the color obtained by the photographic input device appears as a vector joining the start point of the object color vector and the origin (i.e., black). In the general color image, therefore, it is difficult for each picture element to be approximated by a color in a plane which is defined by the three colors, i.e., black, the object color vector and the light source color vector.

The second problem is that a color change in high fidelity to an original image cannot be accomplished. Assuming that each picture element value be a point in a two-dimensional plane defined by the object color vector and the light source color vector, according to the method of the Reference 3, the color change is accomplished by calculating the components of said vectors for each picture element and by using the calculated component and the vector after the change of the object color vector. However, the real picture element value is distributed not only in said two-dimensional plane but in the vicinity of the same. The distance between the picture element value existing in that vicinity and said plane raises causes not only noises but also the local subtle color texture of the object region and is not eliminated but desirably left. Since the information of the texture of that object region are lost by said method, it is impossible to accomplish the color changes in high fidelity to the original image.

The third problem is the susceptibility to the influences of the light source color. According to the Reference 3, the vector appearing as the randomly scattered components in the three-primary color space, in which the individual picture element values are plotted, are used as the object color so that the color change is accomplished for said object color. Since, however, this object color is subjected to the influences of a light source, disadvantageous or unnatural color change of the object region of the color image is caused, when a design is to be made by the color changing function for the color of an industrial product, which matches the landscape in case the product is placed in the natural ambience. In case a light source color is apart to some extent from the white color for the photography of an image taken from a product having an existing product color when a new color for the product is to be designed (in the landscape of a sunset glow, for example, the sky is red so that the light source color is also red), the product takes the color of the light source. If the candidate color, if any, of a product is used as the color of the object region changed, it does not match the background landscape (i.e., the landscape of the sunset glow in the aforementioned example) but becomes unnatural. If the product of said candidate color is actually placed in said ambience, the product fails to look in said candidate color (in the aforementioned case, a white product takes the red color).

The fourth problem is that the light source color and amount cannot be changed.

The fifth problem is that it is impossible to change the color which is established by the influences of the light coming from an object surrounding the target.

SUMMARY OF THE INVENTION

A first main object of the present invention is to provide a color adjusting method for displaying a color desired by an operator on a full-color display.

A first subobject accompanying the first main object is to provide a method of storing the color prepared by the foregoing method efficiently and systematically.

A second subobject is to provide a data storing method for reducing the number of calculations of a color changing simulation to shorten the execution time period.

A second main object of the present invention is to provide a color changing method of changing the colors of an object, a light source and an ambient light arbitrarily, while considering the input characteristics of an image obtained by a general image inputting, to simulate the object color change in either the ambient changes of such as the weather or time in a real world or in an identical ambience.

More specific subobjects accompanying the aforementioned second main object are as follows:

A first subobject is to provide a color changing method which can be applied for a general color image or a generally used computer system, if any, without any special circuit while considering the colors due to the influences of a light emitted from a substance existing around the object and the color coming from the photography or an input device.

A second subobject is to provide a color changing method which is in high fidelity to an original image without losing the color information of the original image such as the local subtle color texture of an object region.

A third subobject is to provide a color changing method capable of accomplishing the color changes of an object naturally and easily from the image of an object taken in an arbitrary light source, knowing what the product color newly designed looks in the light source of said image, and obtaining the image of the product adjusted to an arbitrary background landscape.

A fourth subobject is to provide a color changing method which is enabled to obtain an image changed to a natural light source color, by changing the light source color arbitrarily through a change in light source color vector, by changing the light source color vectors, and by changing the color of an object region into one suited for the changed light source color, thereby to check what color the designed product color looks in the changed light source.

A fifth subobject is to provide a color changing method which is enabled to obtain an image changed into a natural ambient color, by arbitrarily changing the color of an ambient light intrinsic to the image and emitted from a substance existing around an object and by changing the color of an object region into one suited for said changed ambient color, to check what color the designed produce color looks in the changed ambient light source.

In order to achieve the aforementioned first main object, a number of chromatically systematized and structured sample colors are arranged and displayed in advance in a display device so that color information may be selected without any bias. The sample color set data are copied into adjusted color set data in accordance with the information inputted from an input device by an operator observing the displayed picture and the adjusted color set data are processed in accordance with the information inputted from the input device.

The following characteristic points (1) to (6) are further afforded:

(1) At least one of the following methods (i) and (ii) is used as a method for processing the adjusted color set data:
  (i) The characteristic amounts are changed to a suitable constant extent; and
  (ii) The characteristic amounts are reset to suitable numerical values.
(2) Two or more methods of processing the adjusted color set data can be simultaneously used;
(3) As a color expressing method, color information can be processed by using either of the method using the RGB and another method.
(4) What position the color being adjusted is expressed by each expression is displayed in numerical values or by a graph.
(5) A suitable number of adjusted colors are stored altogether, and the adjusted colors are named and stored.
(6) In order to shorten the time period for executing the color changing simulations, the data expressed with the RGB and the data expressed by another method are mixed and stored.

Next, in order to achieve the aforementioned second main object, a bias vector, a light source color vector, an object color vector, and a color texture vector, the latter three vectors using as their start points the points moved from an original point by the bias vector, are presumed to determine the positional coordinates for the individual picture element values in a three-dimensional space defined by the light source color vector, the object color vector and the color texture vector. Either a plurality of said four vectors are simultaneously used or one of them is used to accomplish the color changes by using said positional coordinates and said changed four vectors. Here, the component values corresponding to the individual vector may be used without using those vectors. Since processings are substantially similar to the vectors in case the component values are used, the following description to be made hereinafter is directed to the use of the vectors only but not to the use of the component values so as to simplify the description.

The following characteristic points are further afforded:

① In order to achieve the aforementioned first subobject, with an assumption that the bias vector be the linear summation of the ambient light color vectors and the input device bias vector, these two vectors are presumed and changed together or individually to accomplish the color changes;

② In order to achieve the aforementioned second subobject, the color texture vector are normal to the plane which is defined by the light source color vector and the object color vector;

③ In order to achieve the aforementioned first, second, third, fourth and fifth subobjects, the light source color vector and the object color vector are extracted at first from the three-dimensional three-primary color space plotting the individual picture element values of a color image, and the bias vector and the color texture vector are then presumed;

④ In order to achieve the aforementioned first, second, third, fourth and fifth subobjects, it is assumed that the positional coordinates of an arbitrary picture element values are expressed by Ms, Mb and Md in the three-dimensional positional coordinates which are defined by the light source color vector Cs, the object color vector Cb and the color texture vector Cd. Then, a color vector in the three-dimensional three-primary color space of said picture element values is expressed as follows:

$$C = MsCs + MbCb + MdCd + Ca + B$$

(wherein letters Ca and B designate an ambient color vector and an input device bias vector, respectively). After the light source color vector Cs, the object color vector Cb, the color texture vector Cd and the ambient light color vector Ca have been changed, the picture element values are expressed in the color vector to change the color.

⑤ In order to achieve the third and fourth subobjects, a pure object color vector freed from the influences of the light source color vector is extracted from the object color vector and is used to change the color.

⑥ In order to achieve the third subobject, the pure object color vector is changed to accomplish the color changes for obtaining an image in which the object color of the scene of the color image is changed.

(7) In order to achieve the third and fourth subobjects, the light source color vector and the pure object color vector are changed together or individually. After this, the light source color vector and pure object color vector are used to generate the object color vector.

(8) In order to achieve the third and fourth subobjects, when the pure object color vector is to be extracted or to use generating the object color vector influenced by the light source, there is used the relation in which the RGB components of the object color vector are the individual products of the RGB components of the light source color vector and the pure object color vector.

(9) In order to achieve the fifth subobject, the pure ambient color vector freed from the influences of the pure object color vector is extracted from the ambient color vector and the pure object color vector, and said pure ambient color vector is used to accomplish the color change.

(10) In order to achieve the fifth subobject, the pure ambient color vector is changed to accomplish the color change for obtaining an image having a changed ambience in the scene of a color image.

(11) In order to achieve the fifth subobject, the pure object color vector and the pure ambient color vector are changed together or individually. After this, the pure object color vector and pure ambient color vector are used to generate the ambient color vector.

(12) In order to achieve the fifth subobject, when the pure ambient color vector is to be extracted or to used generating the ambient color vector influenced by the object color there is used the relation in which the individual RGB components of the ambient color vector are the pictures of the individual RGB components of the pure ambient light color vector and the pure object color vector.

(13) In order to achieve the fourth and fifth subobjects, the color change is accomplished by presuming the plural or single vector from a model color image and by changing either the object color of the color image to have its color changed or the ambient atmosphere with the use of said vector or vector.

(14) In order to achieve the third, fourth and fifth subobjects, the changes of the target vector are accomplished by determining representative points thereinto give said representative points a sample color set changed, and by changing the points in the target vector linearly at a ratio of the individual RGB components of the representative points to the sample color set in the three-primary color space.

(15) In order to achieve the fourth and fifth subobjects, the changes of the target vector are accomplished by changing their lengths at a predetermined ratio.

BRIEF DESCRIPTION OF THE DRAWINGS

FIG. 8 shows a picture of a color adjusting subroutine of the color adjusting program;

FIG. 9 shows a picture of a color changing trial in the color adjustment;

FIG. 22 is an explanatory view showing a three-primary color space in which the picture element values of a color image are plotted;

FIG. 24 is an explanatory view showing the correspondences between an object region in an image and the picture element values in the three-primary color space; and FIG. 25 is an explanatory diagram showing the system of the prior art.

DETAILED DESCRIPTION OF THE PREFERRED EMBODIMENTS

First of all, the principle of the color adjusting method according to the present invention will be described in the following.

The present method arranges and displays a number of sample colors which are chromatically systematized and structured. These sample colors substantially cover all colors that can be humanly perceived and include colors approximating all colors. The color designated from the sample color set by a keyboard or another input means has a high degree of freedom as a start point of the color adjustment.

Next, the present invention establishes and processes the correlations between the R, G and B components and a plurality of color expressing methods, H, S and V. For example, the H, S and B and the R, G and B are related by the following formula, as is described in the Reference 1:

$H = (bc - gc) \times 60$ (when $R = max$);

$H = (2 + rc - bc) \times 60$ (when $G = max$);

$H = (4 + gc - rc) \times 60$ (when $B = max$);

$S = (max - min)/max$; and $V = max$, wherein:
max (R, G, B) = max;
min (R, G, B) = min;
rc = (max − R)/(max − min);
gc = (max − G)/(max − min); and
bc = (max − B)/(max − min).

For a fine adjustment of colors, a processing executed for one chromatic expression is reflected upon another chromatic expression. In case the aforementioned two expressions are used, what is displayed with the R, G and B leads to the changes of the H, S and V. Moreover, the color being adjusted is indicated and is correlatively updated. The H, S and V are difficult to change at will by the operations of the R, G and B, and vice versa. It is, moreover, troublesome for a single color expression to change the displayed color freely. Since, in the present invention, the plural color expressions are correlatively processed, the degree of freedom is high enough to adjust the color finely.

Next, in the present invention, the adjusted colors and their color series can be named for storage. For this, it is sufficient to write the color data such as the R, G and B in a storage medium in association with their names and to call them. These names can be used to call the previously adjusted colors or their color series without any direct data on the colors.

Next, in the present invention, as to the color changing simulations, the data expressed with the RGB and the data expressed by another method are mixed and stored. The color changes are not accomplished before the data of the RGB are changed into intermediate expressions such as the components such as the light source color vector, as are used in the color changing processing of the present invention. If, therefore, the portions (e.g., the body of an automobile in the picture) to have their colors changed are intermediately expressed in advance, the calculation time period for changes from the RGB to the intermediate expressions is eliminated.

Figure 20:
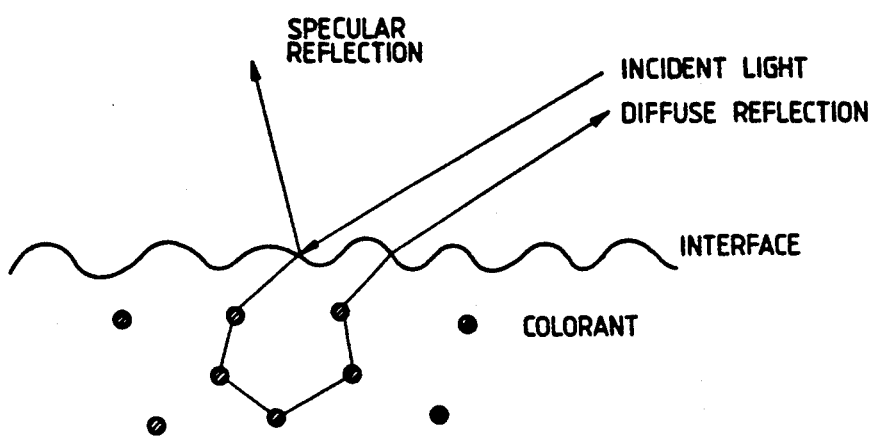
FIG. 20 is an explanatory diagram showing reflected component of a color.
Figure 21:
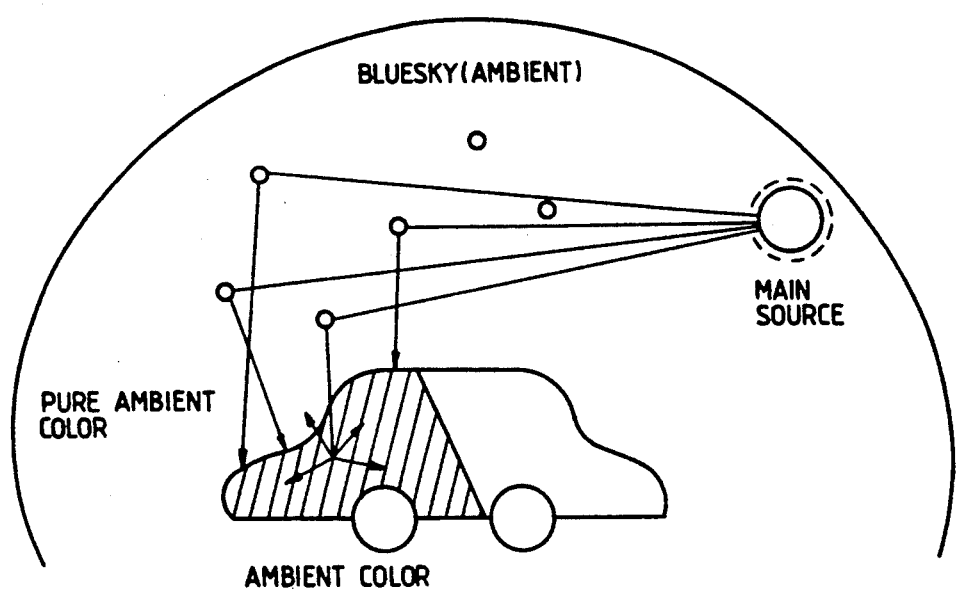
FIG. 21 is an explanatory diagram showing an ambient light.

Next, the principle of the color changing according to the present invention will be described with reference to FIGS. 20, 21 and 22. In FIG. 20, a light coming from a main light source to an object is divided into a light component (which is frequently called a specular reflection component) reflected on the interface of the object and a light component (which is also frequently called a diffuse reflection component) which comes into and goes out of the object after it has repeated collisions with the colorants in the substance of the object. The specular reflection component is reflected at an angle determined by the angle of incidence and the direction of the interface of the object whereas the diffuse reflection component is reflected in all the directions. The specular reflection component can be deemed to have the same three-primary color component ratio as that of the main light source, and the diffuse reflection component has a three-primary component value determined by the main light source and the reflectivity intrinsic to the object. Therefore, the specular reflection component is called the light source color, and the diffuse reflection component is called the object color. Moreover, the reflectivity intrinsic to the object is called the pure object color because it frees the influences of the light source from the object color.

The model thus far described is sufficient in case only the main light source is present as a light source for the object. Generally speaking, however, the light emitted from the main light source impinges upon the substances existing around the object so that it is reflected to illuminate the object, as shown in FIG. 21. This is the reason why the shadow portion geometrically shielded from the light of the main light source is not blacked but has a color. This light coming from the ambient substances will be called the pure ambient color, and the light, which is produced when the pure ambient color is reflected on the interface of the object at the reflectivity (of the pure object color) intrinsic to the object, will be called the ambient color.

Since the pure ambient color belongs to the light from the ambience, the ambient color depends neither upon the interface direction of the object nor upon the geometrical positional relation of the position of a view point if the object is illuminated in all the directions.

As has been described above, the three-primary value C of an image thus obtained in colors can be expressed by the following formula:

$$C = \begin{pmatrix} R \\ G \\ B \end{pmatrix} = MsCs + MbCb + Ca; \quad (1)$$

wherein:
Cs designates the light source color and is expressed by:

$$Cs = \begin{pmatrix} Rs \\ Gs \\ Bs \end{pmatrix}; \quad (2)$$

Cb designates the object color and is expressed by:

$$Cb = \begin{pmatrix} RoRs \\ GoGs \\ BoBs \end{pmatrix}; \quad (3)$$

Co designates the pure object color (i.e., the reflectivity intrinsic to the object) and is expressed by:

$$Co = \begin{pmatrix} Ro \\ Go \\ Bo \end{pmatrix}; \quad (4)$$

Ca designates the ambient color and is expressed by:

$$Ca = \begin{pmatrix} RoRa \\ GoGa \\ BoBa \end{pmatrix}; \quad (5)$$

and
Cap designates the pure ambient color (of the light from the ambience) and is expressed by:

$$Cap = \begin{pmatrix} Ra \\ Ga \\ Ba \end{pmatrix}. \quad (6)$$

On the other hand, the Ms and Mb are scalar quantities. Of which, the quantity Ms indicating the quantity of the light source color (of specular reflection) is determined from the relations in the geometrical angles among the position of the main light source to a point in the object with respect to each picture element, the interface direction of the object and the position of the view point (i.e, the camera). Thus, the quantity Ms indicates the quantity of the object color (having the specular component). The quantity Mb is determined from the geometrical angle between the position of the main light source and the object interface (but has no relation to the position of the view point (i.e., the camera)).

In other words, the quantities Ms and Mb are quantities intrinsic to the object region, which depend upon the position of the individual picture elements in the target object region in the picture but not upon the other factors. The three primary values of each picture element can be deemed to exist at a position determined by the quantities Ms and Mb when the picture element is projected in the plane defined by the vectors Cs and Cb.

In the actual picture, however, the picture element values exist not only in but also apart from the aforementioned plane. Since the distances between those picture element values and the plane contain important information such as the texture of the object region, they have to be expressed. For this necessity, the following color texture vector Cd is introduced:

$$Cd = \begin{pmatrix} Rd \\ Gd \\ Bd \end{pmatrix}, \quad (7)$$

wherein: the product of this vector Cd and the scalar quantity Md designates the distance between the picture element value and the plane defined by the vectors Cs and Cb. The scalar Md is a value intrinsic to the object region like the scalars Ms and Mb.

Thus, it is possible to deem that the three primary values of each picture element exist in the position, which is determined by the scalars Ms, Mb and Md, in the three-dimensional plane defined by the vectors Cs, Cb and Cd. The three primary values of each picture element can be expressed by the following formula while considering the bias color B of the input device:

$$C = \begin{pmatrix} R \\ G \\ B \end{pmatrix} = MsCs + MbCb + MdCd + Ca + B. \quad (8)$$

Since the scalars Ms, Mb and Md are intrinsic to the object region corresponding to each picture element, the picture element value having its color changed can be determined by using the above-specified formula (8) after the vectors Cs, Cb, Cd and Ca have been changed.

For the vector changes, the light source color vector Cs, the pure object color vector Co and the pure ambient color vector Cap are first changed, and the object color vector Cb and the ambient color vector Ca are then changed by the formulas (3) and (5). If the pure object color vector is changed with the light source color vector and the pure ambient color vector being fixed while considering these two vectors as the ambient factors intrinsic to the image, the color changes of the object in an identical ambience can be simulated. If, on the other hand, the light source color vector and the pure ambient color vector are changed as the ambient factors varying with the weather, the time and so on while leaving the pure object color vector fixed, it is possible to simulate how the color of the object looks when the optical ambience is changed.

FIG. 22 is a diagram plotting each picture element value of a general color image in the three-dimensional three-primary color space. Since the picture element value is dense in the object color vector and the light source color vector, these two vectors can be separated to extract another vector.

An embodiment, in which the color adjusting method of the present invention is added to a color changing simulation system, will be described in detail in the following.

First of all, the summary of the present color changing simulation system will be described. The present system has the image data of an automobile to change and display the body color in real time in accordance with instructions from an input device. In the present system, the present invention is used to determine what color the body color is to be changed into.

Figure 1:
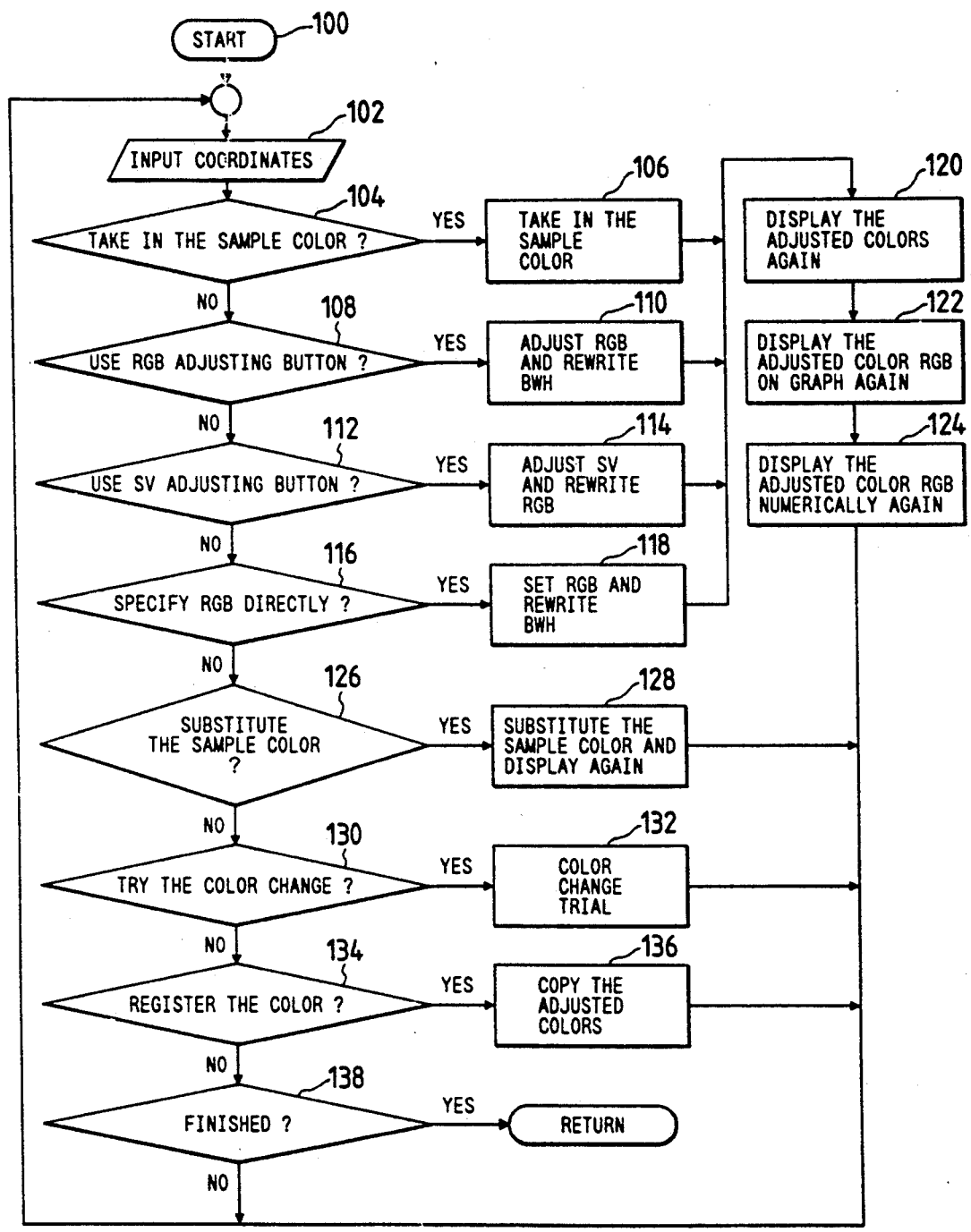
FIG. 1 is a flow chart showing color adjusting procedures according to the present invention.
Figure 2:
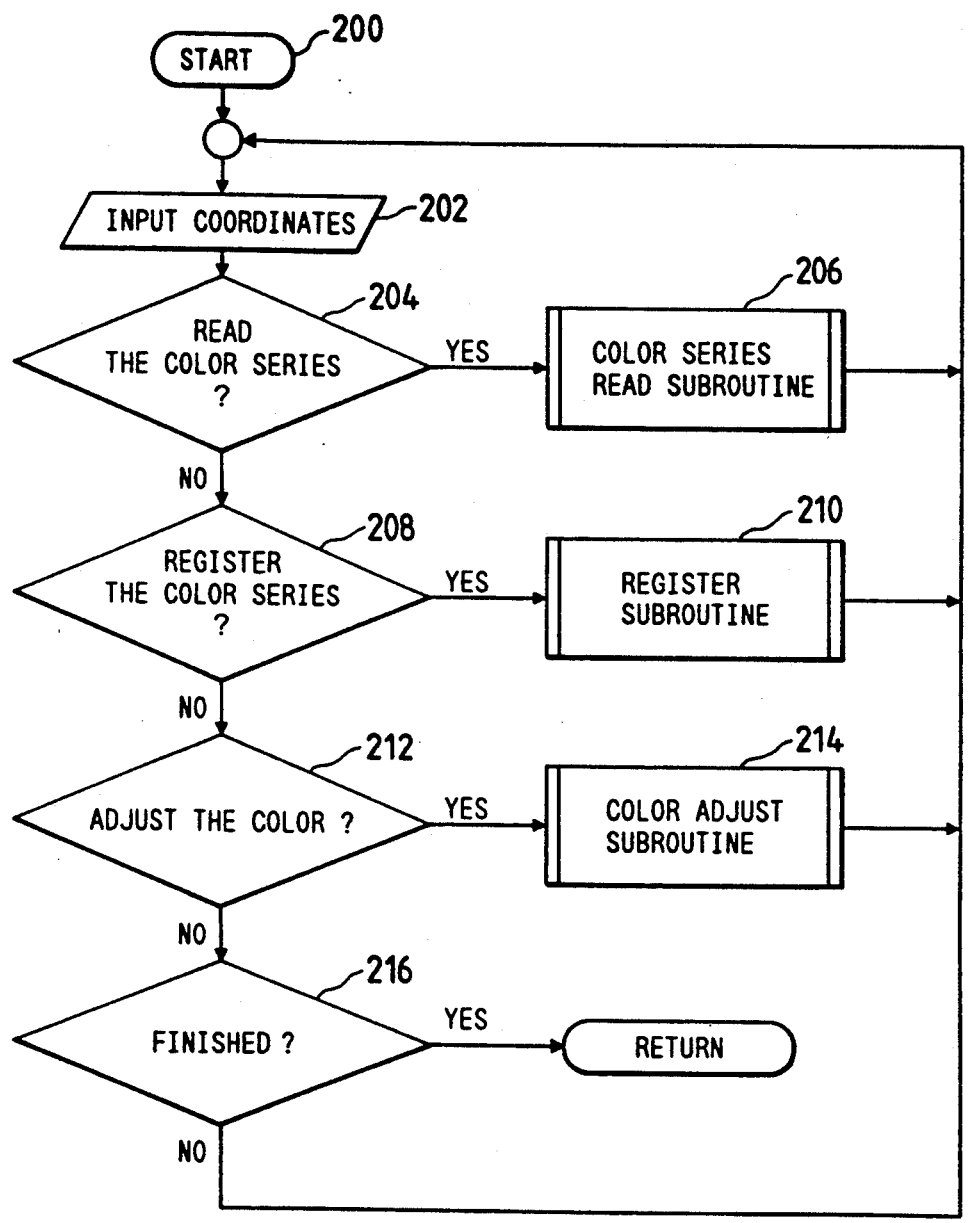
FIG. 2 is a flow chart to be executed in case a color adjusting picture is called from the fundamental picture of a system for accomplishing the color change after the color adjustment according to the present invention.
Figure 3:
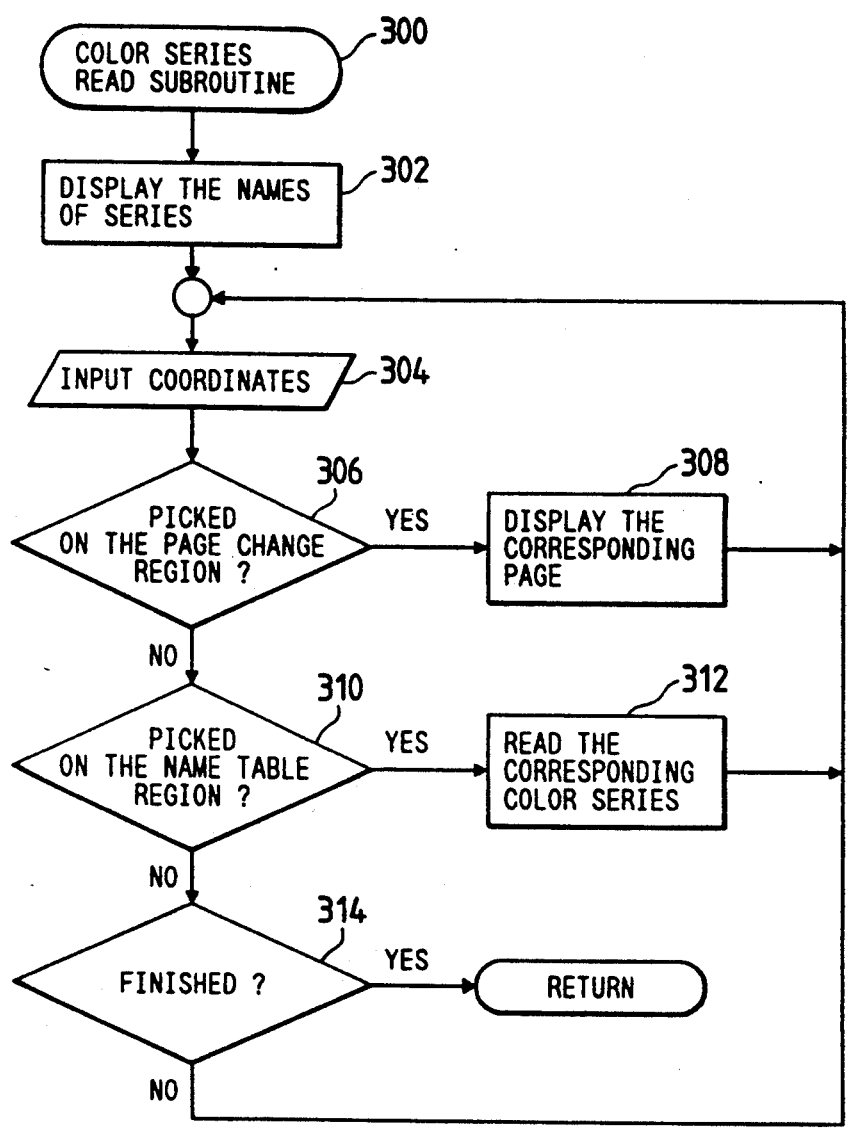
FIG. 3 is a flow chart showing the subroutine of a block 206 of FIG. 2.
Figure 4:
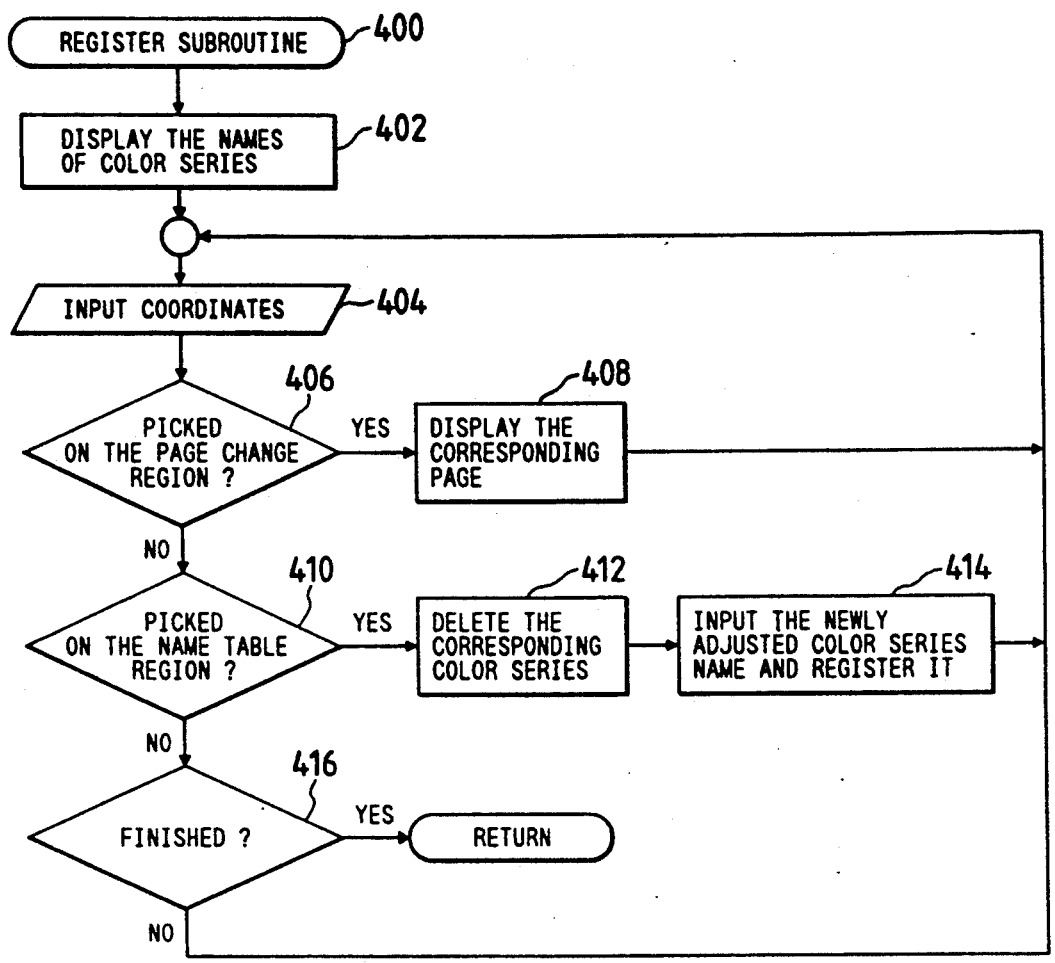
FIG. 4 is a flow chart showing the subroutine of a block 210 of FIG. 2.
Figure 5:
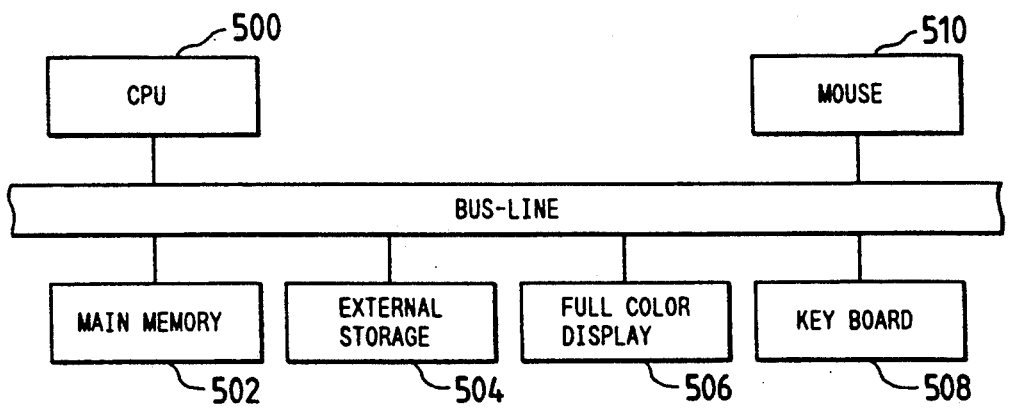
FIG. 5 is a block diagram showing an apparatus for realizing the present system.
Figure 6:
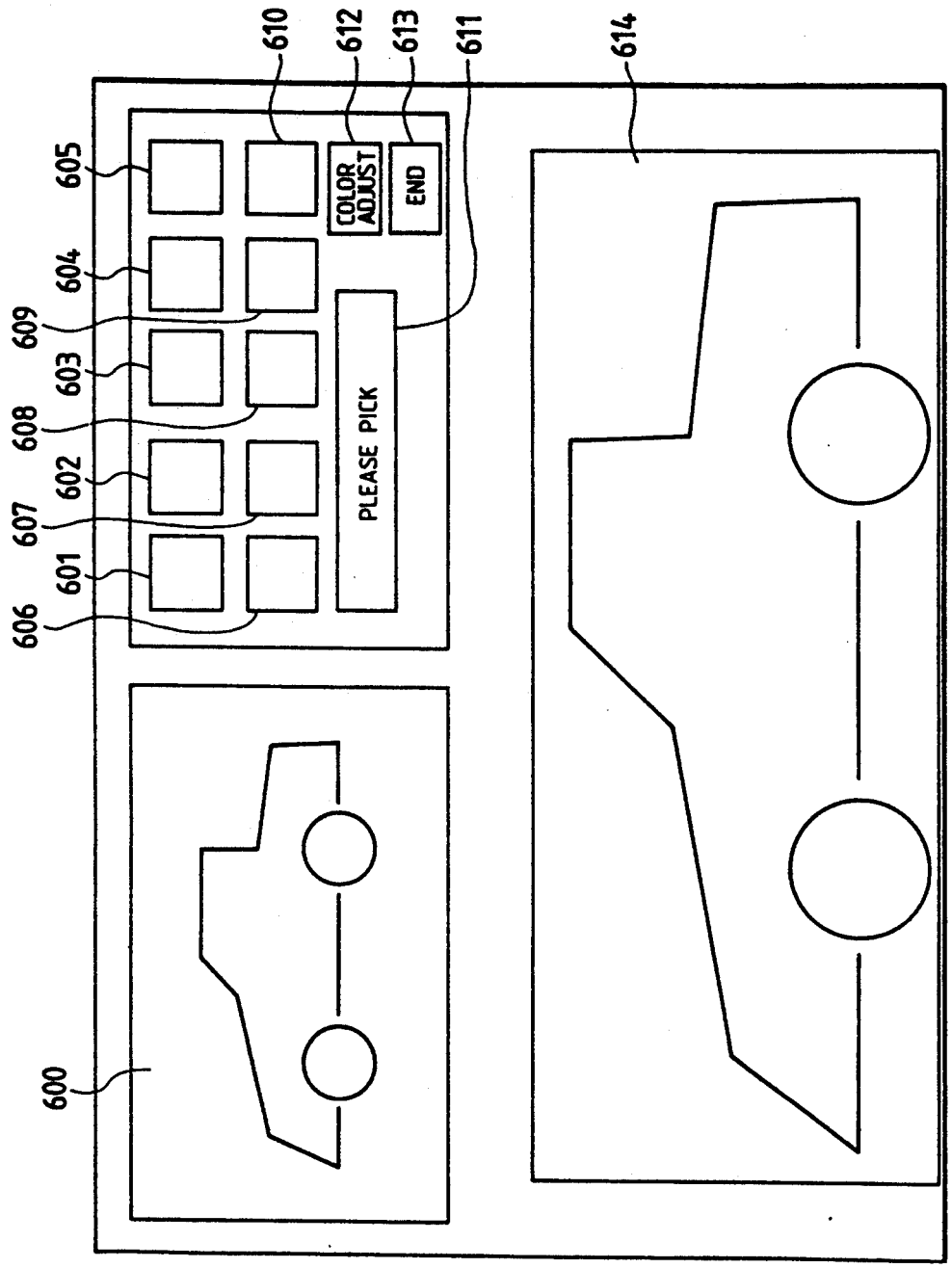
FIG. 6 is the fundamental picture of the present color changing system.
Figure 7:
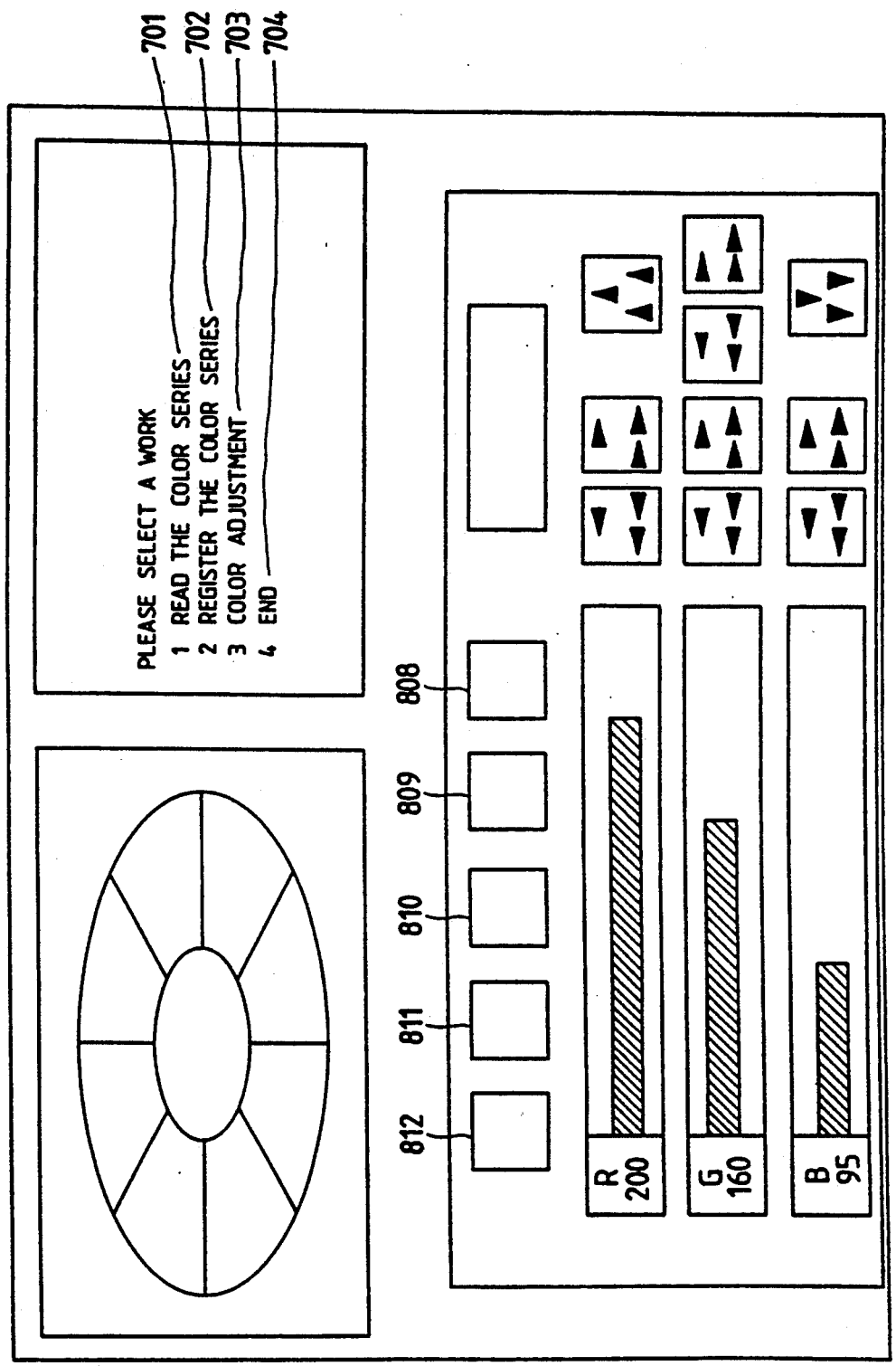
FIG. 7 shows the fundamental picture of a color adjusting program.
Figure 10A:
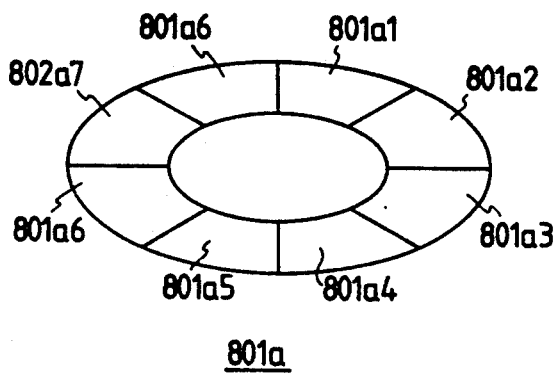
FIG. 10 (A) and FIG. 10 (B) explain the Ostwald color system used in the present embodiment.
Figure 10B:
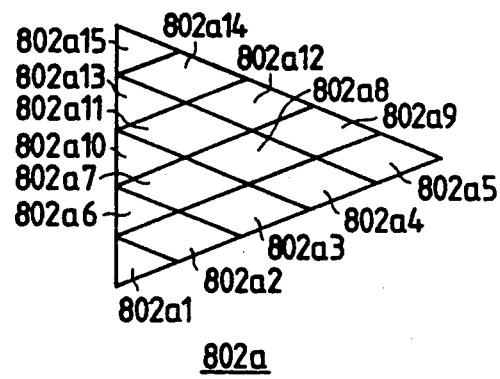
Figure 11A:
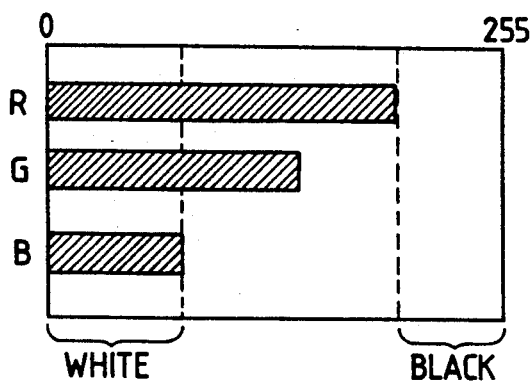
FIG. 11 (A) and FIG. 11 (B) are explanatory views showing a color expressing method in which the 255 - maximum, minimum and hue are used as characteristic values by determining the maximum and minimum of RGB components.
Figure 12:
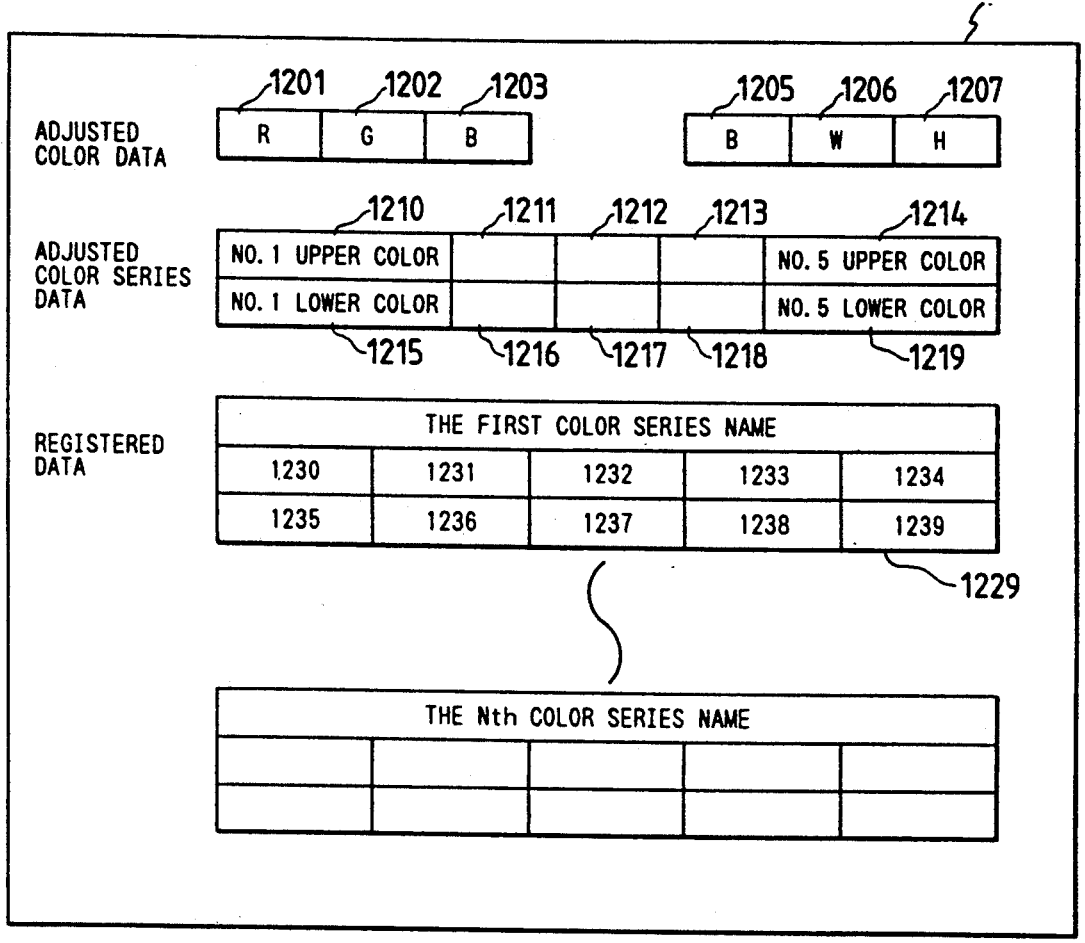
FIG. 12 is a block diagram showing variables to be stored in a main memory for executing the present invention.
Figure 13:
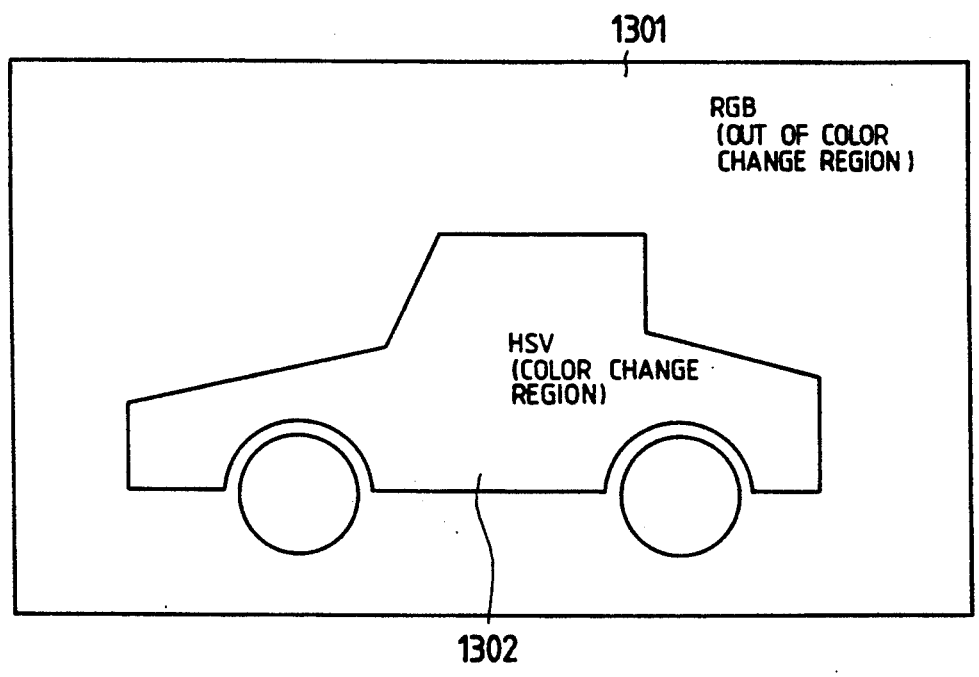
FIG. 13 is a diagram showing the behavior in which the data expressed with the RGB and the data expressed with the HSV are mixed.

FIG. 1 is a flow chart for realizing the present invention; FIG. 2 is a flow chart showing a routine to be executed in case a color adjusting picture is called from the fundamental picture of the present color changing system; FIG. 3 is a flow chart showing the subroutine of a block 206 of FIG. 2; FIG. 4 is a flow chart showing the subroutine of a block 210 of FIG. 2; FIG. 5 is a block diagram showing an apparatus for realizing the present system; FIG. 6 is a fundamental picture of the present color changing system; FIG. 7 is a fundamental picture of a color adjusting program; FIG. 8 is a picture of a color adjusting subroutine in the color adjusting program; FIG. 9 is a picture of a color changing trial in the color adjustment; FIG. 10 is an explanatory view showing the Ostwald color system used in the present embodiment; FIG. 11 is an explanatory view showing a color expression method in which 255 - maximum, minimum and hue are used as characteristic values by determining the maximum and minimum of the RGB components; FIG. 12 is a block diagram showing variables to be stored in a main memory for executing the present invention; and FIG. 13 is an explanatory view for explaining the behavior in which the data expressed with the RGB and the data expressed with the HSV are mixed.

First of all, the apparatus for executing the present color changing system will be described with reference to FIG. 5. As shown in FIG. 5, either the input of a later-described color series name or the instruction of a system start is inputted by means of a key board 508. The coordinates on a full color display 506 are inputted by means of a mouse 510. A pointer on the display is moved to a target region by means of the mouse, and the button of the mouse is depressed. This depression inputs the coordinates indicated by the pointer so at this time "the region is picked".

When a predetermined instruction is inputted by the mouse 510 or the key board 508, the present color changing system is started to execute the display program by a central processing unit CPU 500 so that the picture shown in FIG. 6 is displayed on the full color display 506. A display window 600 of FIG. 6 displaying a color unchanged picture which is stored in advance in a main memory 502 and read out from an external storage (e.g., a hard disc) 504 of FIG. 5. Reference numerals 601 to 610 of FIG. 6 designate display windows displaying the color sample set into which the color is to be changed. Here are displayed first and second color series of later-described registered data. For example, the first color of the first color series, the second color of the first color series, the first color of the second color series and the second color of the second color series are sequentially displayed in the display windows 601, 602, 606 and 607, respectively. If the region of a sample color set displayed in any of the display windows 601 to 610 is picked up, the data of the sample set are transferred to the color changing program to start the color changing program so that the result is displayed in a display window 614.

Here will be described the color changing program. This program maps the RGB data, which are to be changed, into the HSV space to effect suitable coordinate transformations in the HSV space so that the color changes may be accomplished by mapping the result inversely into the RGB space. Since, however, the original image to have its color changed is not displayed as it is, it need not always be expressed in the RGB. In the present embodiment, therefore, the region to have its color changed is made to have data so that its coordinates may be soon transformed, whereas the background portion to have its color left unchanged is made to have data in the RGB so that it may be displayed as it is. This is called the RGB-HSV data mixture.

The display windows 601 to 610 of FIG. 6 are divided into two kinds of single color and vertically divided two colors. The picture of the automobile of one color is displayed in the display window 614 if the sample color region of the single color is picked, and the picture of the automobile of two-tone colors is displayed in the display window 614 if the sample color region of the two-color region is picked. A display window 611 displays a guidance line for displaying instruction items to the operator. A region 612 displays a color adjusting button for starting the color adjusting program when picked. A region 613 displays an end button for ending the present color changing system when picked.

Next, the color adjusting program will be described in the following. FIG. 2 is a flow chart showing the color adjusting program, and FIG. 7 is a fundamental picture of the color adjusting program. If the region of the color adjusting button 612 is picked, the program is transferred to a block 200 of FIG. 2 so that the picture of FIG. 7 is displayed on the full color display 506 of FIG. 5. Letter line regions 701 to 704 of FIG. 7 are selection branches for selecting the works when the regions of the corresponding letter lines are picked. When the letter line region 701 is picked, a block 204 turns true to execute the block 206. When the letter line region 702 is picked, a block 208 turns true to execute the block 210. When the letter line color series 703 is picked, a block 212 turns true to execute a block 214. When the letter line region 704 is picked up, a block 216 turns true to end the color adjusting program so that the display of the full color display 506 is returned from the picture of FIG. 7 to the picture of FIG. 6.

The register subroutine of the block 210 of FIG. 2 will be described in the following. FIG. 4 is a flow chart of this register subroutine. In case the register subroutine is executed, the picture to be displayed in the full color display of FIG. 5 is substantially identical to that of FIG. 7, but not the selection branch, as shown in FIG. 7, but the registered color series name is displayed in the upper righthand display window. In case the registered color series are so may that they cannot be displayed at one time, they are separately displayed on a plurality of pages. The changes of the pages are accomplished by picking a predetermined region (at blocks 406 and 408 of FIG. 4). If one of the color series names being displayed is picked (at a block 410 of FIG. 4) as the work is selected in advance in FIG. 7, the corresponding registered data are deleted (in a block 412 of FIG. 4) so that a new color series name is inputted by means of the key board 508 of FIG. 5. This series name and adjusted color series data 1210 to 1219 of FIG. 12 are assembled together into the forms of registered data 1229 to 1239, which are stored in place of the deleted data in the main memory 502 of FIG. 5 (in a block 414 of FIG. 4). The registered data are composed of first to N-th color series, as shown in FIG. 12, of which the first and second color series are displayed as the color sample set in the fundamental picture of the color changing system of FIG. 6.

The registered data are read out in the adjusted color series by the read subroutine of the block 206 of FIG. 2. This read subroutine is started by picking the letter series region 701 of FIG. 7 in the fundamental picture of the color adjusting program of FIG. 7. FIG. 3 is a flow chart of the read subroutine. In case the read subroutine is executed, the picture to be displayed in the full color display 506 of FIG. 5 is substantially identical to that of FIG. 7. The upper righthand display windows are displayed with not the selection branches of the letter series regions 701 to 704 of FIG. 7 but the registered color series names. When the registered color series are so many that cannot be displayed at one time, they are separated into a plurality of pages and displayed. The changes of pages are accomplished by picking a predetermined region (in blocks 306 and 308 of FIG. 3). If one of the color series names being displayed is picked (in a block 310 of FIG. 3) as the work is previously selected in FIG. 7, the corresponding register data are copied to the adjusted color series data 1210 to 1219 of FIG. 12 so that adjusted color series display regions 808 to 812 of FIG. 8 are updated and displayed again on the basis of the newly adjusted color series data (in a block 312 of FIG. 3).

On the other hand, the color adjusting subroutine of the block 214 corrects the adjusted color series read out or prepares and stores the color data according to the image in the adjusted color series. The color adjusting subroutine of FIG. 2 is started (in the block 214 of FIG. 2) by picking the letter line region 703 on the fundamental picture of the color adjusting program of FIG. 7 (at the block 212 of FIG. 2). FIG. 1 is a detailed flow chart of the color adjusting subroutine, and FIG. 8 is a picture to be displayed on the full color display 506 in case the color adjusting subroutine is executed. Display windows 801 and 802 of FIG. 8 are displayed, respectively, with a hue circle 801a and one page 802a of the Ostwald color system.

Here will be described the Ostwald color system used in the present embodiment with reference to FIG. 10. The color circle 801a of FIG. 10 is composed of color regions 801a1, 801a2, . . . , and 801a6 which have different hues and an identical saturation and value. For one hue of the hue circle 801a, there is one page 802a of the Ostwald color system. Specifically, the Ostwald color system has 48 pages in case the hue has 48 steps. In the page 802a, the hue is anywhere identical to the corresponding one of the aforementioned hue circle 801a, but the value is varied in accordance with the vertical movement whereas the saturation is varied in accordance with the horizontal movement. In the page 802a of FIG. 10: the region 802a5 has a medium value but the maximum saturation; the region 802a15 has the maximum value but the minimum saturation (of white); and the region 8021 has the minimum value and the minimum saturation (of black).

Figure 11B:
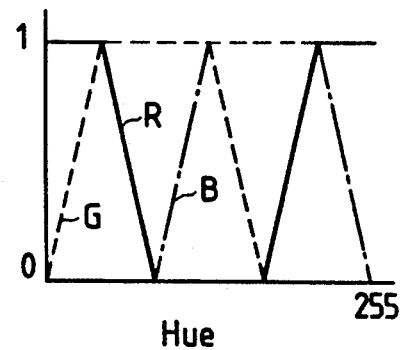

Next, the procedures of the operations will be described with reference to FIGS. 8 and 1. The operator first can pick (at a block 126 of FIG. 1) the target hue region in the hue circle 801a of FIG. 8 to display (at a block 128) the page of the corresponding Ostwald color system at 802a in the display window 802 of FIG. 8. The operator can also pick (at the block 126) letter line regions 803 and 804 to sequentially substitute (at the block 128) the pages of the Ostwald color system to be displayed in the display window 802 of FIG. 8. By picking letter line regions 803 and 804 of FIG. 8, moreover, the pages of the Ostwald color system displayed in the display window 802 of FIG. 8 can be sequentially changed (at the block 128). Next, by picking the target color region in one page of the Ostwald color system displayed (at a block 104), the color data of the region can be taken in (at a block 106) color adjusting data 1201 to 1203 of FIG. 12. The adjusted color thus taken in can be displayed (at a block 120) in an adjusted color display region 829 of FIG. 8. The RGB components of the adjusted thus taken in can be displayed (at a block 122) in regions 816, 817 and 818 on a graph and (at a block 124) numerically in letter line regions 813, 814 and 815. By picking the corresponding regions of the adjusted color series display regions 808 to 812 (at the block 104), moreover, the operator is enabled to take the corresponding color data of the adjusted color series data 1210 to 1219 of FIG. 12, which are set in the previously described read subroutine, in the adjusted color data 1201 to 1203 (at the block 106), to display the taken adjusted color in the adjusted color display region 829 (at the block 120), to display the RGB component of the taken adjusted color in the regions 816, 817 and 818 of FIG. 8 on a graph (at the block 122), and to display the RGB components of the taken adjusted color numerically in the letter line regions 813, 814 and 815 of FIG. 8 (at the block 124). Next, the operator can finely adjust the adjusted colors thus set by the aforementioned method. In the case of the present embodiment, two kinds of finely adjusting methods can be freely accomplished. In order to execute the two kinds of adjusting methods at a high speed, the present embodiment has two types as the internal expressions of the adjusted color data, as shown in FIG. 12. The adjusted colors 1201 to 1203 of FIG. 12 are the color data in which the adjusted colors are expressed with the RGB, and adjusted colors 1205 to 1207 are color data in which the adjusted colors are expressed by the type shown in FIG. 11. Letter B of the color data 1205 indicates the Black value of FIG. 11; letter W of the color data 1206 indicates the White value of FIG. 11; and letter H of the color data 1207 indicates the Hue value of FIG. 11. The relations of the B, W and H to the RGB and the HSV are as follows:

$$R = White + (255 - (Black + White)) * Hue.R;$$

$$G = White + (255 - (Black + White)) * Hue.G;$$

and $$B = White + (255 - (Black + White)) * Hue.B;$$

wherein Hue.R designate the value of a curve R of FIG. 11(B). Moreover:

H = Hue;
S = 255 − (Black + White); .

and

V = 255 − Black.

Here will be described a method in which the RGB adjusting button of FIG. 8 is used for adjusting the adjusted colors finely. When the upper portion of a region 819 of FIG. 8 is picked (at a block 108 of FIG. 1), the R component (i.e., the data 1201 of FIG. 12) of the adjusted color at that time is subtracted (at a block 110) by 1. No operation is conducted if the R component is made negative by the subtraction of 1. If the lower portion of the aforementioned region 819 is picked (at the block 108), the R component (i.e., the data 1201 of FIG. 12) of the adjusted color at that time is subtracted (at the block 110) by 5. No operation is conducted if the R component is made negative by the subtraction of 5. If that R component is changed in case the upper or lower portion of the aforementioned region 819 is picked, the data 1205 to 1207 of FIG. 12 are updated (at the block 110), and the display of the adjusted color display region 829 of FIG. 8, the graphs of the regions 816 to 818 and the numerical values of the regions 813 to 815 are updated and displayed again (at the blocks 120, 122 and 124). The G component (i.e., the data 1202 of FIG. 12) of a region 820 and the B component (i.e., the data 1203 of FIG. 12) of the region 821 are processed like the aforementioned region 819. If the upper portion of a region 822 is picked (at the block 108), the R component (i.e., the data 1201 of FIG. 12) of the adjusted color at that time is incremented (at the block 110) by 1. No operation is conducted if the R component is caused to exceed 255 by the increment. If the lower portion of the region 822 is picked (at the block 108), the R component (i.e., the data 1201) of the adjusted color at that time is incremented (at the block 110) by 5. No operation is conducted if the R component is caused to exceed 255 by the increment. If the R component is changed in case the upper or lower portion of the region 822 is picked, the data 1205 to 1207 of FIG. 12 are updated (at the block 110), and the display of the adjusted color display region 829, the graphs of the regions 816 to 818 and the numerical values of the regions 813 to 815 are updated and displayed again (at the blocks 120, 122 and 124). The G component (i.e., the data 1202 of FIG. 12) of a region 823 and the B component (i.e., the data 1203 of FIG. 12) of a region 824 are processed like the aforementioned region 822.

Next, a finely adjusting method using the SV adjusting button of regions 825 to 828 of FIG. 8 will be described in the following. If the upper portion of the region 825 is picked (at the block 113 of FIG. 1), the Black component (i.e., the data 1205 of FIG. 12) of the adjusted color at that time is subtracted by 1, and the White component (i.e., the data 1206) is incremented by 1 (at a block 114). No operation is conducted in case the Black component is made negative or the White component is caused to exceed 255 by the subtraction or increment. If the lower portion of the region 825 is picked (at the block 112), the Black component (i.e., the data 1205 of FIG. 12) of the adjusted color at that time is subtracted by 5, and the White component (i.e., the data 1205) is incremented by 5 (at the block 114). No operation is conducted in case the Black component is made negative or the White component is caused to exceed 255 by the subtraction or increment. If the aforementioned Black or White component is changed in case the upper or lower portion of the aforementioned region 825 is picked, the data 1201 to 1203 of FIG. 12 are updated (at the block 114), and the display of the adjusted color display region 829, the graphs of the regions 816 to 818 and the numerical values of the regions 813 to 815 are updated and displayed again (at the blocks 120, 122 and 124). The RGB components of the adjusted color are individually increased by 1 or 5 by that button so that the value can be increased while leaving the color and saturation as they are. In other words, an upward shift is caused on the page 802a of the Ostwald color system of FIG. 8. If the upper portion of the region 828 of FIG. 8 is picked (at a block 112 of FIG. 1), the Black component (i.e., the data 1205 of FIG. 12) of the adjusted color at that time is incremented by 1, and the White component (i.e., the data 1206) is subtracted by 1 (at the block 114). No operation is conducted in case the Black component is caused to exceed 255 or the White component is made negative by the increment or subtraction. If the lower portion of the region 828 is picked, the Black component of the adjusted color at that time is incremented by 5, and the White component is subtracted by 5 (at the block 114). No operation is conducted in case the Black component is caused to exceed 255 or the White component is made negative by the increment or subtraction. If the aforementioned Black or White component is changed in case the upper or lower portion of the region 828 is picked, the data 1201 to 1203 of FIG. 12 are updated (at the block 114 of FIG. 1), and the display of the adjusted color display region 829 of FIG. 8, the graphs of the regions 816 to 818 and the numerical values of the regions 813 to 815 are updated and displayed again (at the blocks 120, 122 and 124). The RGB components of the adjusted color are individually subtracted by 1 or 5 by that button so that the value can be reduced while leaving the color and saturation as they are. In other words, a downward shift is caused on the page 802a of the Ostwald color system of FIG. 8. If the upper portion of the region 826 of FIG. 8 is picked (at the block 112 of FIG. 1), the Black component (i.e., the data 1205 of FIG. 12) of the adjusted color at that time is incremented by 12, and the White component (i.e., the data 1206) is also incremented by 1 (at the block 114). No operation is conducted if the sum of the aforementioned Black and White components are caused to exceed 255 by that increment. If the lower portion of the region 826 is picked (at the block 112 of FIG. 1), the Black component (i.e., the data 1205) of the Black component of the adjusted color at that time is incremented by 5, and the White component (i.e., the data 1206) is also incremented by 5 (at the block 114). No operation is conducted in case the sum of the aforementioned Black and White components is caused to exceed 255. If the aforementioned Black or White component is changed in case the upper or lower portion of the aforementioned region 826 is picked, the data 1201 to 1203 of FIG. 12 are updated (at the block 114), the display of the adjusted color display region 829 of FIG. 8, the graphs of the regions 816 to 818 and the numerical values of the regions 813 to 815 are updated and displayed again (at the blocks 120, 122 and 124). The maximum of the RGB components of the adjusted color is subtracted by 1 or 5 whereas the minimum is incremented by 1 to 5 by that button, the saturation can be decreased while leaving the hue and value as they are. In other words, a leftward shift is caused on the page 802a of the Ostwald color system of FIG. 8. If the upper portion of the region 827 of FIG. 8 is picked (at the block 112 of FIG. 1), the Black component (i.e., the data 1205 of FIG. 12) of the adjusted color at that time is subtracted by 1, and the White component (i.e., the data 1206) is also subtracted by 1 (at the block 114). No operation is conducted in case the aforementioned Black or White component is made negative by that subtraction. If the lower portion of the aforementioned region 827 is picked (at the block 112), the Black component (i.e., the data 1205 of FIG. 12) of the adjusted color at that time is subtracted by 5, and the White component (i.e., the data 1206 of FIG. 12) is also subtracted by 5 (at the block 114). No operation is conducted in case the aforementioned Black or White component is made negative by that subtraction. If the aforementioned Black or White component is changed in case the upper or lower portion of the region 827 is picked, the data 1201 to 1203 of FIG. 12 are updated (at the block 114), and the display of the adjusted color display region 829, the graphs of the regions 816 to 818 and the numerical values of the regions 813 to 815 are updated and displayed again (at the blocks 120, 122 and 124). The maximum of the RGB components of the adjusted color is incremented by 1 or 5 whereas the minimum is subtracted by 1 or 5 by that button so that the saturation can be increased while leaving the hue and value as they are. In other words, the upward shift is caused on the page 802a of the Ostwald color system of FIG. 8.

When not the fine adjustments but drastic changes are desired, there is naturally a method of reselection from the sample color set, but the RGB components of the regions 1201 to 1203 of FIG. 12 can be reset. The latter method can be used, too, in case a color is prepared not by using the sample color set in the least but by specifying the values of the RGB components directly. This method of resetting the values of the RGB components will be described in the following. If the graph region 816 of FIG. 8 is picked (at a block 116 of FIG. 1), the value of the R component in case the leading end of the graph of the component R is set (at a block 118) as the data 1201 of the R component of the adjusted color data of FIG. 12. On the basis of the set data 1201 to 1203, the data 1205, 1206 and 1207 corresponding to the B, W and H components of FIG. 12, respectively, are updated (at the block 118), and the display of the adjusted color display region 829 of FIG. 8, the graphs of the regions 816 to 818 and the numerical values of the regions 813 to 815 are updated and displayed again (at the blocks 120, 122 and 124). In other words, it looks to the operator that the leading end of the graph drawn in the region 816 of FIG. 8 flies to the picked position and that the numeral values of the regions 813 to 815 and the adjusted color display of the region 829 are varied. The graph of the region 817 has the same function as the aforementioned one for the data 1202 of the G component of the adjusted color of FIG. 12, and the graph of the region 818 has the same function as the aforementioned one for the data 1203 of the B component of the adjusted color.

Next, the trials will be described in the following. If the region 806 of the letter line is picked (at a block 130 of FIG. 1) any time while the picture of FIG. 8 is being displayed, the data 1201 to 1203 or the color data of the adjusted color at that time are transferred to the aforementioned color changing program to start the color changing program (at a block 136). The result is display in the display window 801 of FIG. 8, as shown in FIG. 9. After this, the ordinary color adjustment can be accomplished, and the trials can be accomplished many times after the readjustment. When the hue circle 801a is desired on the aforementioned display window 801, the region 805 of the letter line is picked, and the trial result disappears from the display window 801 so that the hue circle 801a is displayed.

Next, the method of registering the adjusted color by the aforementioned method in the adjusted color series will be described in the following. If the adjusted color display region 829 is picked (at a block 134) any time while the picture of FIG. 8 is being displayed, the state is the register standby to make it impossible to take the sample color set and adjust the color. In this state, any of the adjusted color series display regions 808 to 812 is picked. If the upper portion of the region 808, for example, is picked, the RGB data (i.e., the data 1201 to 1203 of FIG. 12) of the adjusted color RGB at that time are copied to the data 1210 of the upper color of the adjusted color series No. 1 of FIG. 12. If the copy is finished, the adjusted color series display regions 808 to 812 are updated and displayed again on the basis of the new adjusted color series data 1210 to 1219 to release the register standby state. Although the adjusted color is on, on the other hand, the adjusted color series can have two colors (i.e., the upper and lower colors) registered for one number. Here, if the upper and lower colors are set in different colors, the picture of the automobile of two-tone colors is displayed as a result of the color changes when the series appears on the fundamental picture of FIG. 6 so that the operator picks the two-tone color region.

FIG. 13 shows the behavior in which the out of color changing region 1301 expressed by the RGB and the color changing region 1302 expressed by the HSV to express the object image are mixed.

Finally, the function to make a substitution by a certain portion of the aforementioned embodiment and to be added to the embodiment will be described in the following. (1) As the systematic sample color set, the Munsell color system can be used in place of the Ostwald color system. Although one page corresponding to a certain hue is triangular in the Ostwald color system, there is attained in the Munsell color system a rectangle in which an ordinate indicates the value whereas the abscissa indicates the chroma. (2) As the method of displaying the adjusted color data: the numerical values and graphs of the HSV can be used in place of the numerical values and graphs of the RGB; the numerical values and graphs and the YMCB1 specified in the printing operation can be used, and these can be simultaneously used together in an arbitrary combination. (3) As the expressions for resetting the characteristic values freely, the RGB values need not be used, but the graphs may be made with the HSV or other expressions and picked. (4) The ten adjusted colors need not be registered and read altogether, but the number of colors to be gathered may be arbitrary, and the colors need not be gathered but may be individually named and registered. (5) The colors need not be named when they are registered.

Next, an embodiment, in which the color changes according to the present invention are applied to a color design in an arbitrary ambience of industrial products, will be described with reference to FIGS. 14 to 24.

The detailed processing procedures in a CPU 2301 of FIG. 23 will be described with reference to the flow chart of FIG. 14 as well as the system structure of FIG. 23 to which are applied the color changes according to the present invention.

Figure 23:
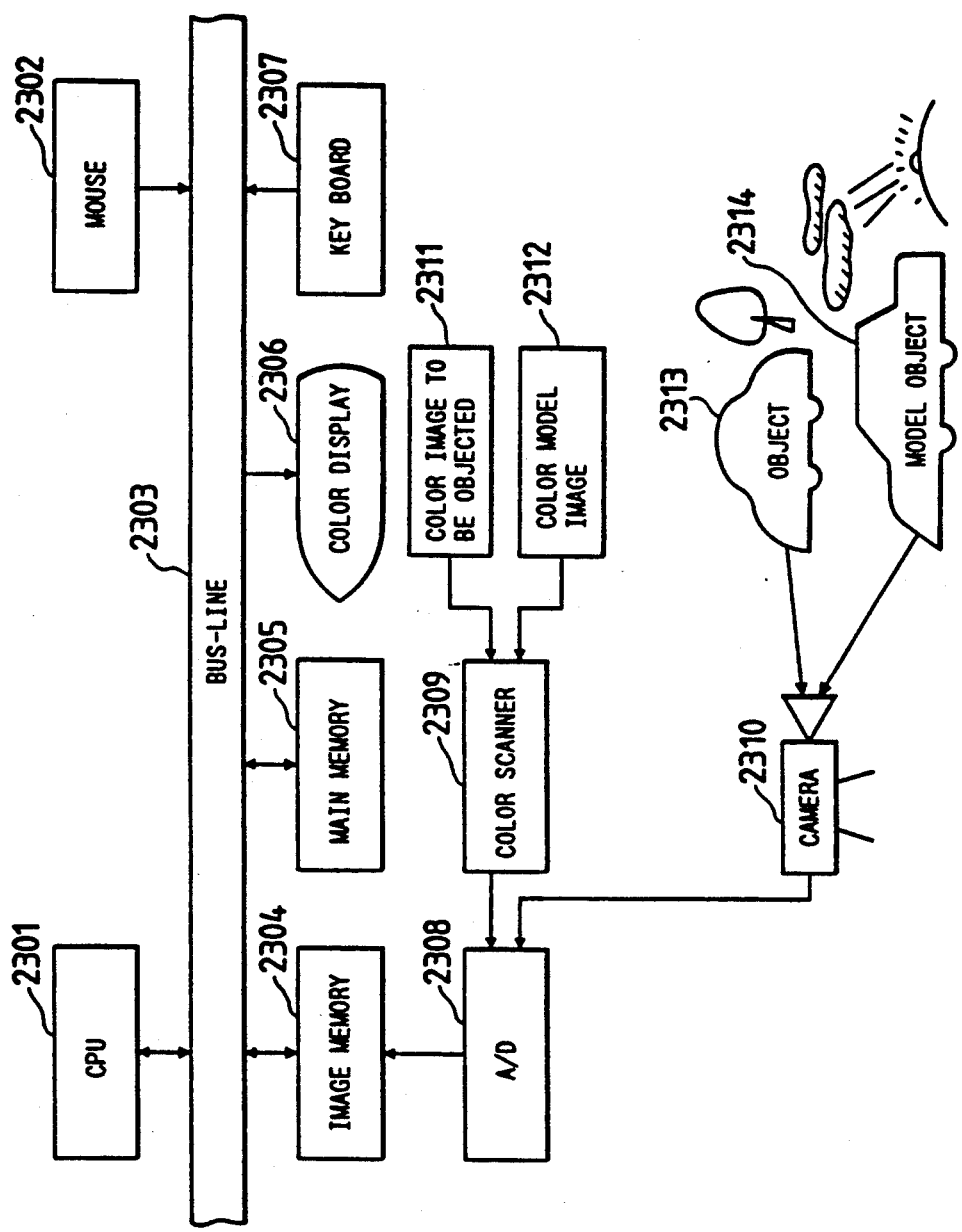
FIG. 23 is a block diagram showing the overall structure of a processing system for realizing the present invention.

Step 141: a color image 2311 to be objected or a color model image 2312 is inputted to an A/D converter 2308 by a color scanner 2309 of FIG. 23.

In this case, an object in an external ambience or a model object 2314 may be taken by a camera 2310 so that the result image of the object image or the model object may be inputted to the A/D converter 2308.

The image data digitized by the A/D converter 2308 are stored in an image memory 2304 and further in a main memory 2305 by way of a bus line 2303.

In the following description, both the aforementioned color mode image and model object image will be shortly referred to as the "model image".

Step 142: It is decided whether (YES) or not (NO) the color changes are to be accomplished by the use of the aforementioned model image.

Step 143: In the case of YES, the model image is inputted by the processing similar to that of the aforementioned step 141.

Step 144: The picture element values of the three-primary color space, in which the picture element values in the image are plotted, as shown in FIG. 24, are classified so that the image may be processed for the individual picture element values of the common object region. Although there are a variety of these segmentation methods, a mask image is prepared for each object region in the image according to the present embodiment so that the three primary values of the picture element corresponding to the mask are segmented in the three-primary space.

Step 145: The light source color vector, the object color vector, the color texture vector, the bias vector, the ambient color vector, the input device bias vector, the pure object color vector and the pure ambient color vector are determined. The detailed processing procedures will be described with reference to the flow chart of FIG. 15. At steps 21 and 22 of FIG. 15, the light source color vector and the object color vector are first separated by the method described in the foregoing Reference 4 (by G. J. Klinker et al.) by using the fact that the picture elements of the image become dense in the vicinity of the light source color vector and the object color vector in the three-primary color space in which the individual picture elements are plotted. Next, at a step 23, the pure object color vector is separated from the object color vector by using the light source color vector in accordance with the foregoing formula (3). The pure object color and the catalogue color of the product can be compared to correct the object color vector.

The vector joining the origin and the start point of the object color vector is the bias vector. At a step 24, there can be conceived a variety of methods of separating the ambient color vector and the input device bias vector from the bias vector, as will be exemplified in the following three ways:

(1) If two or more different object color regions are present, in the three-primary color space, an intersection of the extensions of the ambient color vector in the two different object regions are determined to give the terminal point of the input device bias vector by the method of the Reference 4 for determining the object color vector and the light source color vector, so long as the picture elements are so densely present in the vicinity of the ambient color vector as to specify the direction of the ambient color vector.

(2) In case the bias vector, i.e., the start point of the object color vector in the three-primary color space, in which the individual picture element values of an original image is determined highly accurately, if the bias vector is expressed by:

$$A = \begin{pmatrix} Rbsp \\ Gbsp \\ Bpsp \end{pmatrix}, \tag{9}$$

then, $$A = C + B \tag{10},$$

(wherein Ca and B designate the ambient color vector and the input device bias vector, respectively), if $$B = \begin{pmatrix} Rin \\ Gin \\ Bin \end{pmatrix}, \tag{11}$$

then, from the foregoing formula (5), the following formula holds:

$$\begin{pmatrix} RoRa \\ GoGa \\ BoBa \end{pmatrix} + \begin{pmatrix} Rin \\ Gin \\ Bin \end{pmatrix} = \begin{pmatrix} Rbsp \\ Gbsp \\ Gbsp \end{pmatrix}. \tag{12}$$

If two or more different object color regions are present, the formula (12) also holds for another object region:

$$\begin{pmatrix} Ro'Ra \\ Go'Ga \\ Bo'Ba \end{pmatrix} + \begin{pmatrix} Rin \\ Gin \\ Bin \end{pmatrix} = \begin{pmatrix} R'bsp \\ G'bsp \\ B'bsp \end{pmatrix}. \tag{13}$$

Since the pure object color vector $Co=(Ro, Go, Bo)^T$ and $Co'=(Ro', Go', Bo')^T$ are determined from the foregoing formula (3), the pure ambient color vector $Ca=(Ra, Ga, Ba)^T$ and the input device bias vector $B=(Rin, Gin, Bin)^T$ can be determined by solving the formulas (12) and (13).

(3) The characteristics of the bias color of the image input device can be empirically specified to some extent. This method frequently has no practical problem and is simple.

In the present embodiment, any of the foregoing methods (1) to (3) is used to determine the input device bias vector and the ambient color vector. At a step 25, the pure ambient color vector is separated from the ambient color vector by using the pure object color vector in accordance with the foregoing formula (5).

At a step 26, the color texture vector is so determined as to intersect normal to the plane which is defined by the light source vector and the object color vector. The color texture vector may have a suitable length.

Step 146: Representation points are determined for the individual vectors which are determined at the foregoing step 145. The representative points have the following functions: The first function is to observe the color of a determined point of the vector in a color display 2306 of FIG. 23. This function is convenient for a vector change. The second function is to change the vector easily by giving a changed sample color for the color of a representative point and by changing the target vector linearly at the individual RGB component ratios of the color of the representative point and the sample color in the three-primary space. According to this function, the operator is enabled to compare and observe the sample color as the changed color of that of the representative point on the color display 2306. Because of the two functions described above, the conditions for the representative point to satisfy are to have the average value of the three primary values of the vector and the near picture element values. In the present embodiment, the representative point satisfying those conditions is selected as the most dense point by projecting the picture element values in the vicinity of the vector positively.

If the answer of NO is decided at the step 142 of FIG. 1, the same processings as those of the aforementioned steps 144, 145 and 146 are executed at steps 147, 148 and 149.

Step 1410: The components of the light source vector Cs, the object color vector Cb and the color texture vector Cd are divided into the individual picture element values in the object region for Ms, Mb and Md. These values Ms, Mb and Md are determined in the following manner. If, for the picture element C expressed by the foregoing formula (8), the following formula is assumed to hold:

$$C = C - (Ca + B), \tag{14}$$

and if the following formulas are assumed to hold:

$$b1=(C \cdot Cs), b2=(C \cdot Cb), b3=(C \cdot Cd);$$

and $$a1=(Cs \cdot Cs), a2=(Cb \cdot Cb), a3=(Cd \cdot Cd),$$

$$a4=(Cs \cdot Cb), a5=(Cb \cdot Cd), a6=(Cd \cdot Cs),$$

then, the values Ms, Mb and Md can be determined by solving the following formulas:

$$Ms \cdot a1 + Mb \cdot a4 + Md \cdot a6 = b1; \qquad (15)$$

$$Ms \cdot a4 + Mb \cdot a2 + Md \cdot a5 = b2; \qquad (16)$$

and $$Ms \cdot a6 + Mb \cdot a5 + Md \cdot a3 = b3. \qquad (17)$$

The values Ms, Mb and Md are those which are intrinsic to the object regions and invariable for the color changing process. These values are stored as the picture element values for the individual picture elements in the image memory 2304 of FIG. 23.

Step 1411: The three-primary space, in which the individual picture element values of the image are plotted, is displayed in the color display 2306 of FIG. 23. At steps 1412 and later, the color change of the vector is accomplished with reference to that three-primary space.

Step 1412: When the vector (which will be shortly referred to as the "model vector") of the model image is used to change the target vector, it is decided whether (YES) or not (NO) the model vector is to be adjusted.

Step 1413: In the case of YES, the length and direction of the model vector extracted at the foregoing step 145 are adjusted. These detailed processing procedures will be described with reference to the flow chart of FIG. 16. The model vector is adjusted in case it is improper for the vector of the changed target image if the model vector is extracted as it is. For example, the model vector has its length shortened, in case its light source color vector is far brighter than that of target image although the light source vector of the model image is desired to be used as the changed vector of the target image. At a step 31 of FIG. 16, at least one of the model vector of the light source color vector, the pure object color vector and the pure ambient color vector is selected to be adjusted. The model vector thus selected is adjusted at steps 32 to 38. The model vector adjusting method of the steps 32 to 38 is similar to the vector changing method using the sample set ratio for changing the pure object color vector, the light source color vector and the pure ambient color vector in respective steps 1415, 1419 and 1423 as shown in FIG. 14. The model vector thus changed is stored as a new model vector in the main memory 2305 of FIG. 23.

Next, the vector changes of the image to be changed will be described in the following. In case the answer of NO is decided at the foregoing step 1412, it is decided at steps 1414, 1418 and 1422 what of the pure object color vector, the light source color vector and the pure ambient color vector is to be changed. In case the answer of YES is decided, the changes of the pure object color vector, the light source color vector, the pure ambient color vector and another vector, if necessary as a result of a change, are accomplished at the steps 1415, 1419 and 1423. After the change of the corresponding vector, the values Ms, Mb and Md of each picture element determined at the step 1410 of FIG. 14 are read from the image memory 2304 of FIG. 23 in the main memory 2305 via the bus line 2303 at steps 1416, 1420 and 1424 so that the changed picture element values are determined for each picture element by using the foregoing formula (8). The color-changed image having the determined changed picture element values is displayed in the color display 2306 of FIG. 23 at steps 1417, 1421 and 1425.

Step 1426: The operator observes the color-changed image and then decides whether (YES) or not (NO) the color changing process is to be finished. If YES, the operator finishes the system of the present embodiment after saving the changed image in the image memory 2304 of FIG. 23.

The detailed processing procedures for changing the pure object color vector at the foregoing step 1415 will be described in the following with reference to the flow chart of FIG. 17. At steps 41 and 42, the three-primary space, the pure object color vector starting from the origin of the space, and the color of the representative point of the pure object color vector are displayed in the color display 2306.

Next, it is decided at steps 43, 45 and 47 what of the sample color set, the ratio and the model vector is used to change the pure object color. In accordance with decision, the pure object color vector is changed at steps 44, 46 and 48 by observing the pure object color vector in the three-primary space and the color of the representative point of the pure object color vector in the color display 2306 of FIG. 23.

At the step 44, the pure object color vector using the sample color set is changed. The sample color set to be used may be selected as one color from the palette of the colors prepared in the color display 2306 or may be specified with the RGB values. In any specification, the position of the sample color set is displayed in the three-primary space, and the sample color set is simultaneously displayed. After the determination of the sample color, the pure object color vector is linearly transformed at the ratios between the value of the representative point and the individual RGB components of the sample point.

At the step 46, the change of the pure object color using the ratios is accomplished. Numerical values are inputted from a key board 2307 so that the pure object color vector is elongated or shortened at the ratios. The elongated or shortened pure object color vector in the three-primary space is displayed in the color display 2306. Simultaneously with this, the color of the point on the elongated or shortened pure object color vector corresponding to the representative point of the pure object color vector is displayed.

Figure 14B:
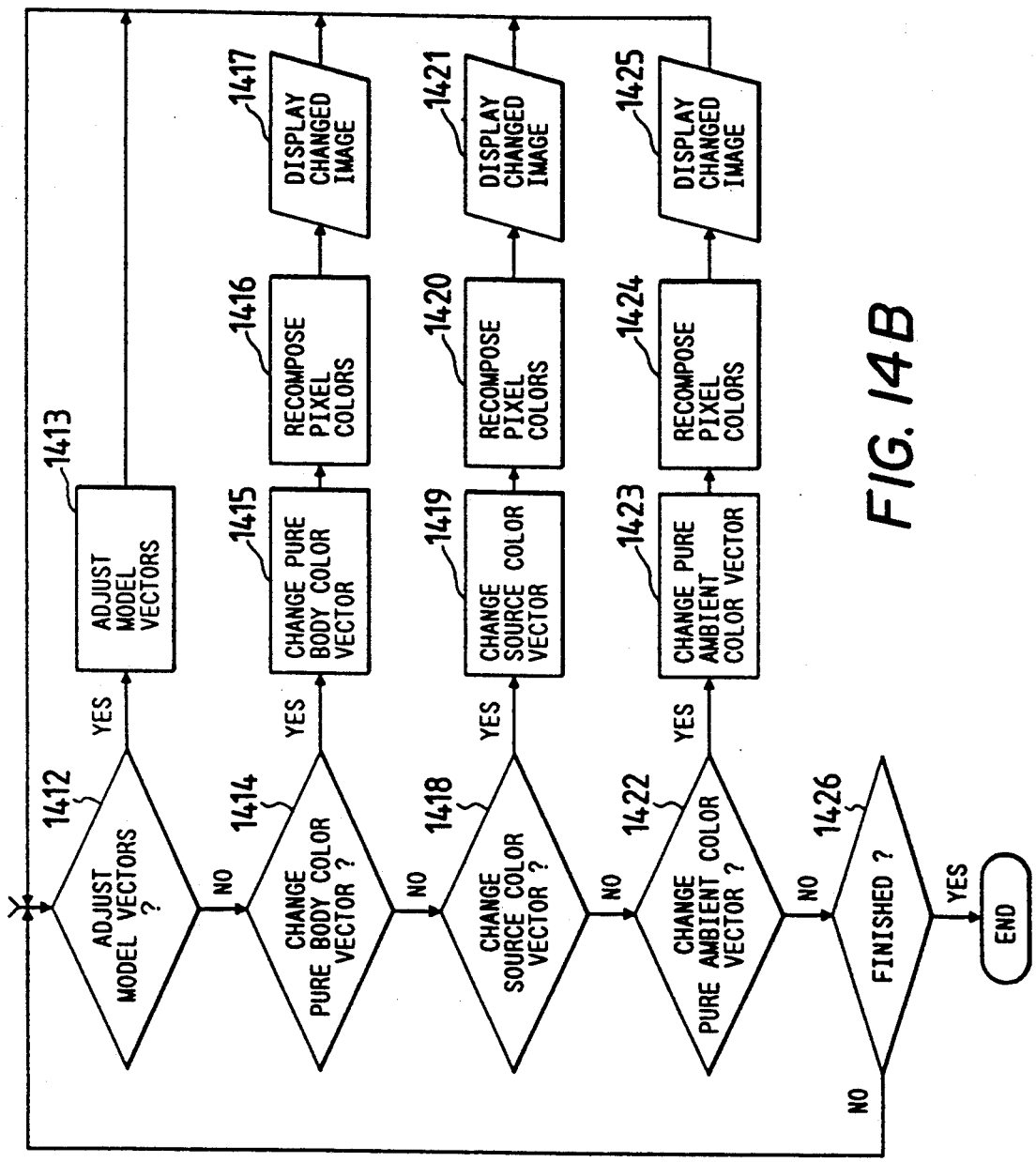
FIG. 14 (A) and FIG. 14 (B) are flow charts showing color changing procedures according to the present invention.
Figure 15:
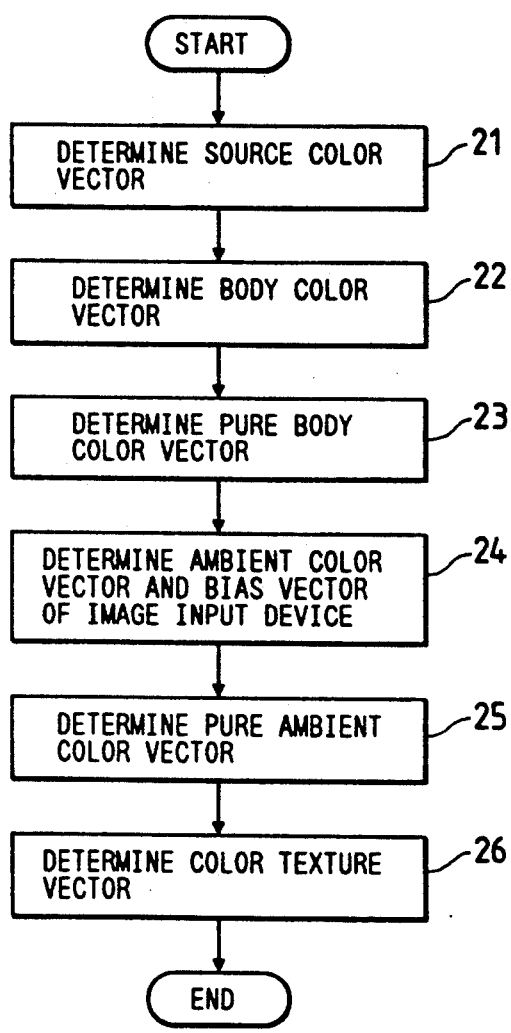
FIG. 15 is a flow chart showing the detailed procedures of vector separations in blocks 145 and 148 in FIG. 14.
Figure 16:
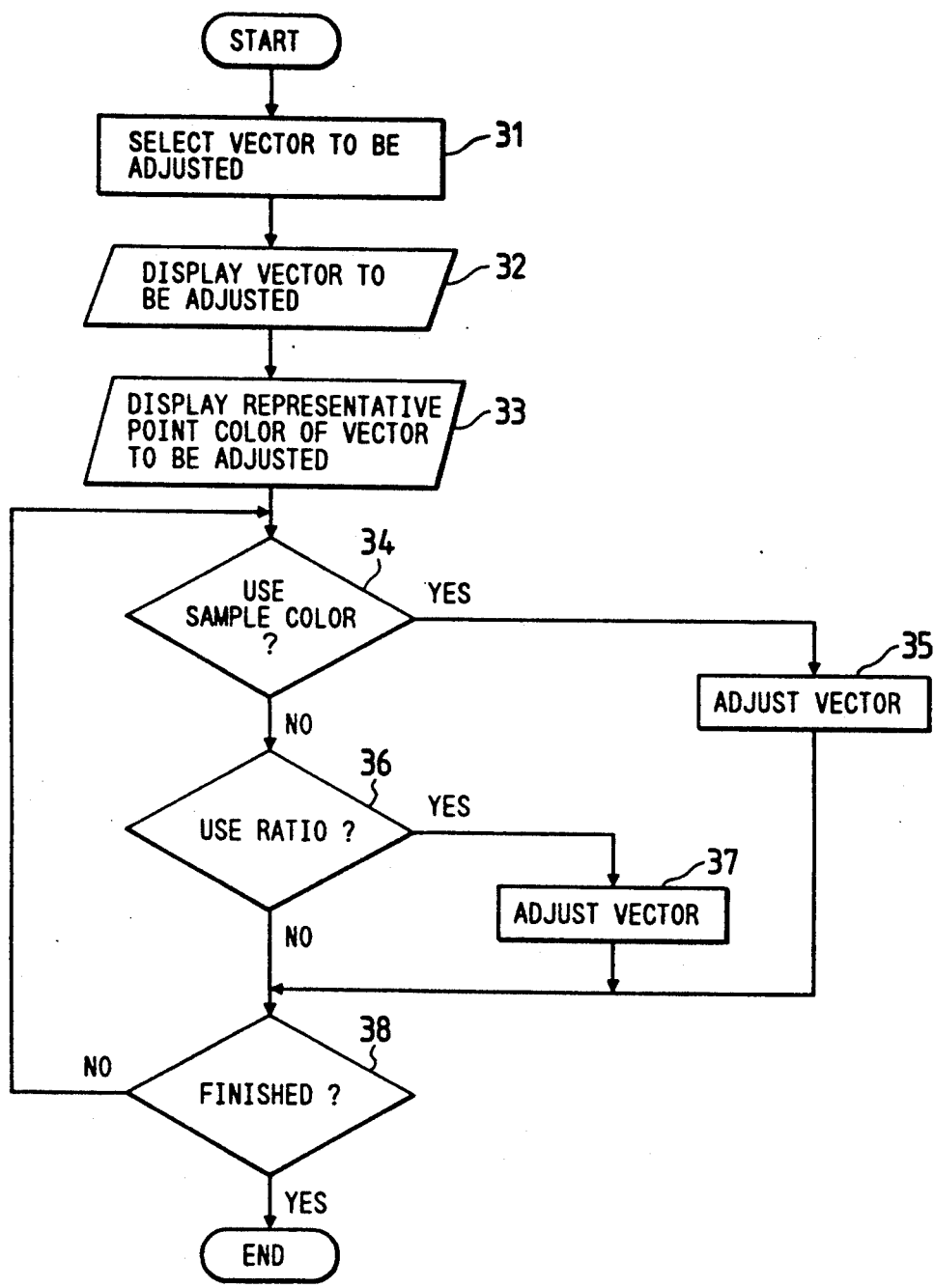
FIG. 16 is a detailed flow chart showing a model vector adjustment at a step 1413 in FIG. 14.

At the step 47, the pure object color vector is changed by using the pure object color vector of the model image which has been extracted from the model image at the step 145 of FIG. 14 and adjusted at the step 1413. In other words, the adjusted pure object color vector of the model image is used as the changed pure object color vector. By this processing, the color of the product can be adjusted to that of the object of the model image.

Figure 17:
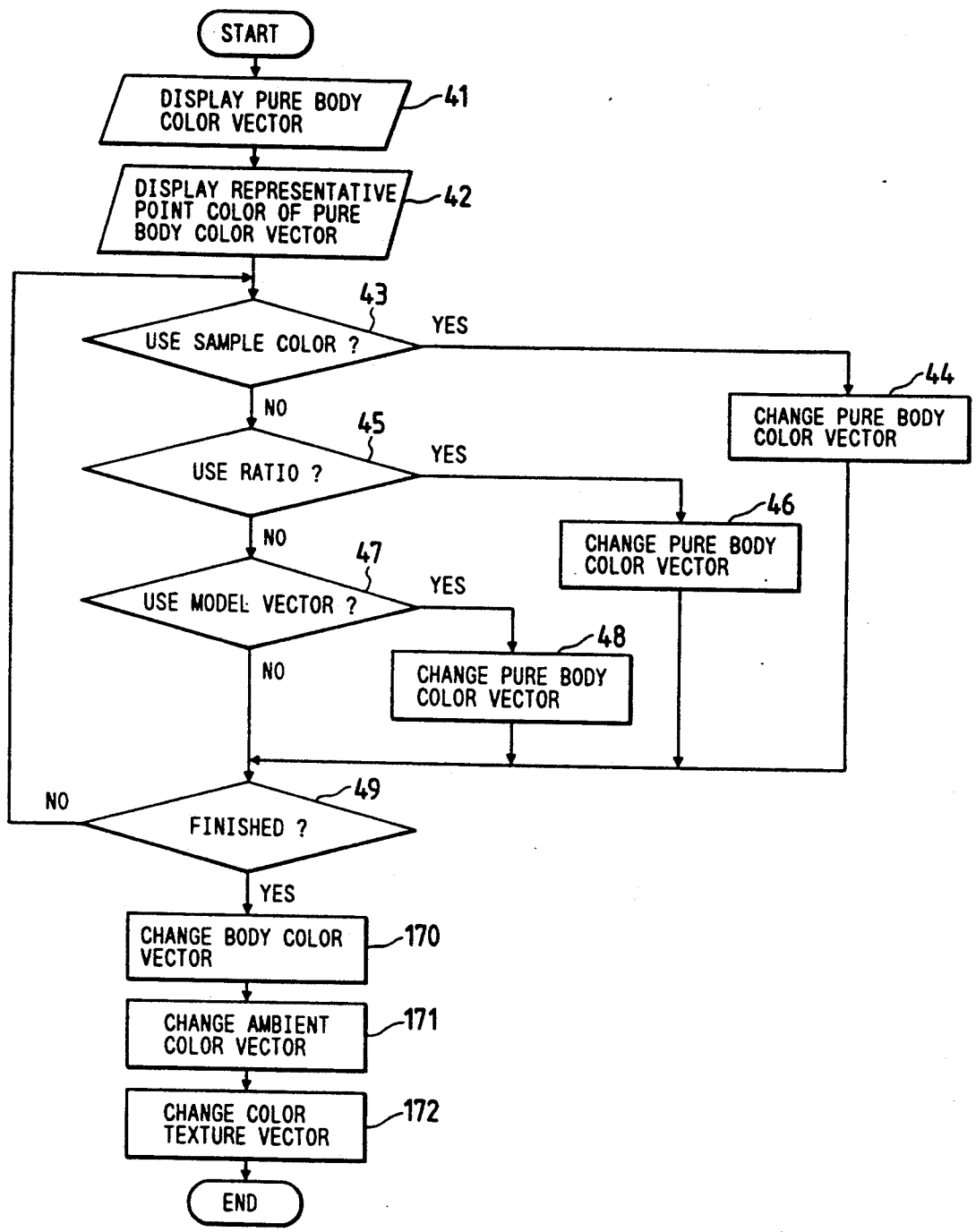
FIG. 17 is a detailed flow chart showing an object color change at a step 1415 in FIG. 14.

After the change of the pure object color vector, at a step 170 of FIG. 17, the object color vector is changed from the changed pure object color vector by using the light source color vector in accordance with the foregoing formula (3). At a step 171, the ambient color vector is changed from the changed pure object color vector and the pure ambient color vector in accordance with the foregoing formula (5). At a step 172, the color texture vector is so changed as to intersect normal to the plane, which is defined by the light source color vector changed without any change in the length and the object color vector.

Figure 18:
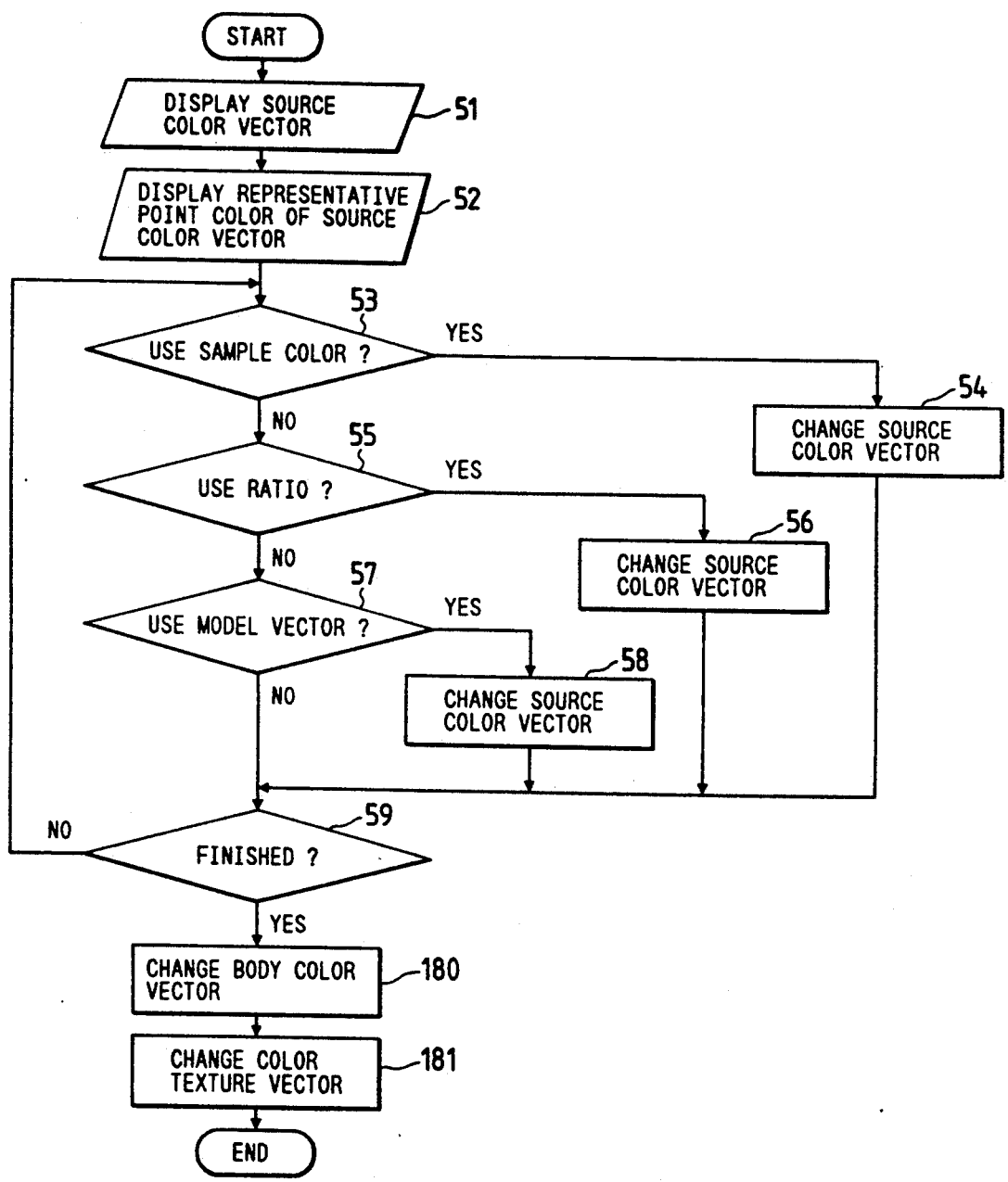
FIG. 18 is a detailed flow chart showing a light source color change at a step 1419 in FIG. 14.
Figure 19:
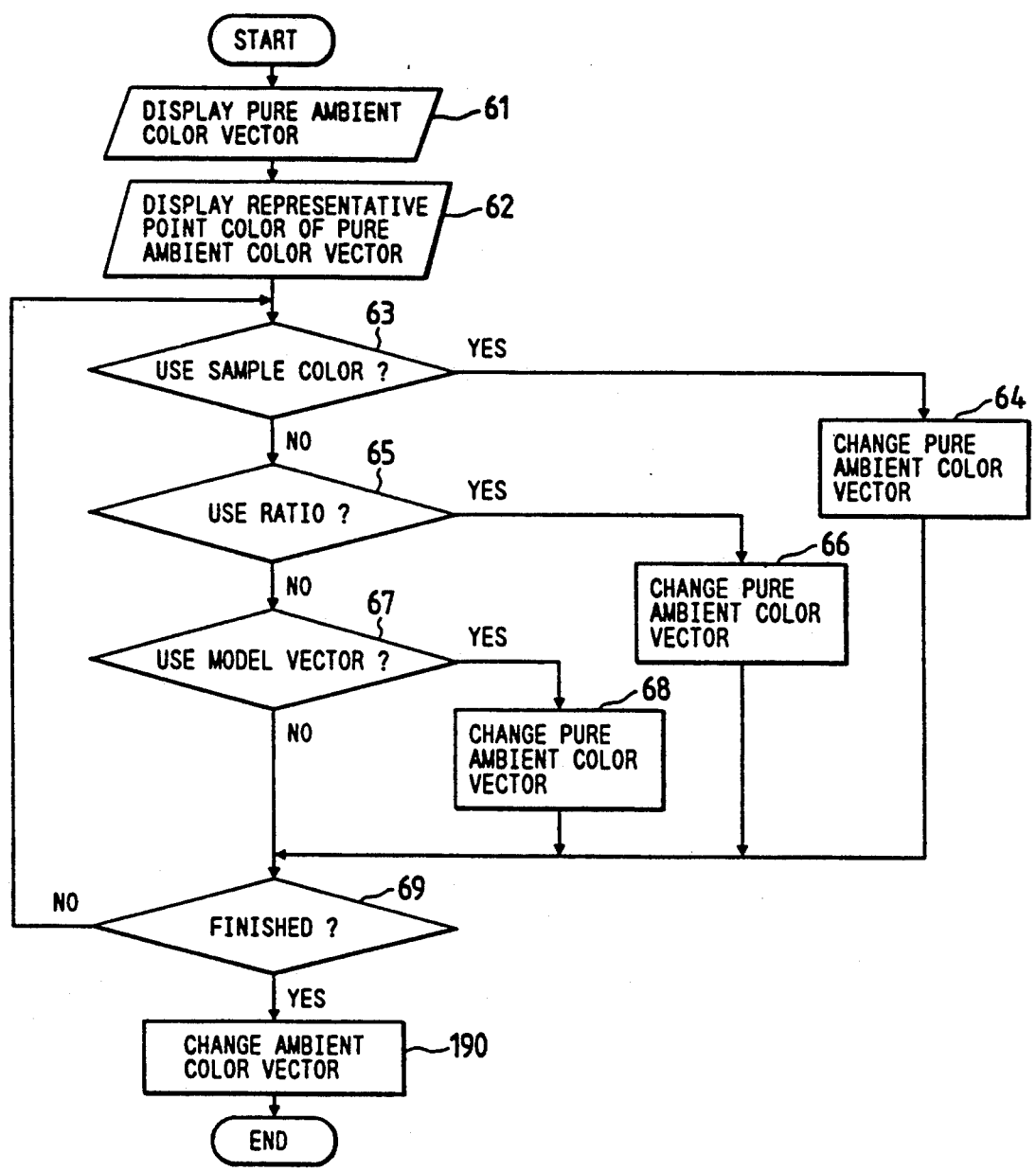
FIG. 19 is a detailed flow chart showing an ambient light color change at a step 1423 in FIG. 14.

Finally, the detailed processing procedures of changing the light source color vector at the step 1419 of FIG. 14 and the detailed processing procedures of changing the pure ambient light color vector at the step 1423 will be described, respectively, with reference to the flow charts of FIGS. 18 and 19. Like the processings of the steps 41 to 49 of FIG. 17 for the pure object color vector, the processings of steps 51 to 59 of FIG. 18 and the processings of steps 61 to 69 of FIG. 19 are accomplished, respectively, for the light source color vector and the pure ambient color vector. At a step 180 of FIG. 18, the object color vector is changed from the pure object color vector and the changed light source color vector in accordance with the foregoing formula (3). At a step 181, in accordance with the changes of the light source color vector and the object vector, the color texture vector is changed to intersect normal to the plane which is defined by the light source color vector changed with any change in the length and the object color vector. If there are a plurality of object regions in the image, the object color vector have to be changed in accordance with the change in the light source color vector. In this case, however, the object color vector of another object region is likewise changed in accordance with the foregoing formula (3). At a step 190 of FIG. 19, the ambient color vector is changed from the pure object color vector and the changed pure ambient color vector in accordance with the foregoing formula (5). If a plurality of object regions are present in the image, the ambient color vector may have to be changed in accordance with the changes of the pure ambient color vector. In this case, however, the ambient color vector of another object region is likewise changed in accordance with the formula (5).

As has been described hereinbefore, the following questions can be known with the real world being left as it is, if the present invention is applied to the color design of the industrial product: ① After the image of a product of a certain color has been inputted to a single-shot system, it is used to change the color of the light of the light source, or the light of the ambience such as the background sky is changed. ② When the product in another color designed in the optical ambience (e.g., the light source of the background light) of an original image is placed, how the design color looks? ③ How the design color looks if the optical ambience is changed?

As has been described hereinbefore, the following effects can be attained according to the present invention:

(1) A color can be efficiently selected from a number of systemized sample colors so that it can be adjusted freely and finely by the several color processing methods. As a result, a desired color can be prepared with neither feeling any gap between the expressed data (e.g., the numerical values of the RGB) and the actually expressed color nor being bothered by the complexity of the color mixing.

(2) One short inputted from the image input device by using the ordinary computer system can be simulated together with the ambient changing with the weather of the real world or the time or the changes of the object color in the same ambience while considering the characteristics of the input device.

Especially when the present invention is used in the color design of the industrial design, it is possible to know what color the product looks in accordance with the changes in the ambience changing with the weather or time and to change the color of the product freely while keeping the same ambience. As a result, the color of the product can be sufficiently and simply examined even if the product color is not actually prepared.

When the color catalogue of the product is to be made, it is useful to know that the product color shines what ambience the product is placed.

Since, moreover, the model image is used for setting the ambience, an effective ambience can be promptly and easily set.

What is claimed is:

1. A color changing method for changing color on a display, the method comprising the steps of:
   inputting individual picture element values of a color image through an image input device;
   plotting the individual picture element values of the color image in a three-dimensional three-primary color space;
   displaying the three dimensional three-primary color space including the plotted individual picture element values of the color image;
   presuming from the plotted picture element values at least three components, including a bias component which expresses bias of said plotted picture element values from an origin, a light source color component which expresses specular reflection light, and an object color component which expresses diffuse reflection light, from four components including said bias component, said light source color component, said object color component and a color texture component which expresses the distance between a picture element value and a plane defined by said light source color component and said object color component;
   determining either three-dimensional positional coordinates of said picture element values in the three-dimensional space, which is defined by said light source color component, said object color component and said color texture component, or two-dimensional positional coordinates of said picture element values in said plane;
   selectively changing two of the three presumed components mutually dependently or one of the three presumed components independently;
   accomplishing a color change of the color image by using the changed components or component and said positional coordinates; and,
   displaying the color image incorporating the color change on the display.

2. A color changing method for changing color in a display, the method comprising the steps of:
   inputting individual picture element values of a color image through an image input device;
   plotting the individual picture element values of the color image in a three-dimensional three-primary color space;

displaying the three-dimensional three-primary color space including the plotted individual picture element values of the color image;

presuming from the plotted picture element values at least three vectors, including a bias vector which expresses the bias of said plotted data from an origin, a light source color vector, and an object color vector which starts from a point displaced from the origin by said bias vector, from among four vectors including said bias vector, said light source color vector, said object color vector and a color texture vector;

determining either three-dimensional positional coordinates of said picture element values in the three-dimensional space, which is defined by said light source color vector, said object color vector and said color texture vector, or two dimensional positional coordinates of said picture element values in a plane which is defined by said light source color vector and said object color vector;

changing the presumed three vectors either collectively or individually; and, accomplishing a color change of the color image by using the collectively changed vectors or individually changed vector and said positional coordinates; and, displaying the color image incorporating the color change or the display.

3. The color changing method according to claim 2, wherein the step of presuming includes a step of changing said bias vector according to the substeps of:

presuming an ambient color vector and an input device bias vector by assuming that said bias vector is a linear summation of said ambient color vector and said input device bias vector; and, changing the ambient color vector and input device bias vector collectively or individually.

4. The color changing method according to claim 3, wherein said ambient color vector and input device bias vector changing step includes the substeps of:

extracting the pure ambient color vector which is generated by eliminating influences of a pure object color vector from said ambient color vector; and, changing the ambient color vector and input device bias vector by using the extracted pure ambient color vector.

5. The color changing method according to claim 4, wherein said ambient color vector and input device bias vector changing step includes the substep of changing said pure ambient color vector.

6. The color changing method according to claim 5, wherein said ambient color vector and input device bias vector changing step includes the substeps of:

determining a representative point in each vector of an object whose display is changed;

determining a changed sample color for said representative point; and, changing the each vector linearly at the ratios of an individual R,G,B component of said representative point and said sample color in said three-dimensional three-primary color space by giving said changed sample color to said representative point.

7. The color changing method according to claim 5, wherein said ambient color vector and input device bias vector changing step is executed by changing the length of the object color vector to be changed at a specified ratio.

8. The color changing method according to claim 4, wherein said extracting step is executed by using a relation that an individual R,G,B component of said ambient color vector is a product of an individual R,G,B component of said pure ambient color vector and an individual R,G,B component of said pure object color vector.

9. The color changing method according to claim 4, wherein said ambient color vector and input device bias vector changing step includes the substeps of:

changing said pure object color vector and said pure ambient color vector mutually-dependently or independently; and, generating an ambient color vector, by using said pure object color vector and said pure ambient color vector.

10. The color changing method according to claim 9, wherein said generating step is executed by using a relation that an individual R,G,B component of said ambient color vector is a product of an individual R,G,B component of said pure ambient color vector and an individual R,G,B component of said pure object color vector.

11. The color changing method according to claim 3, wherein said ambient color vector and input device bias vector changing step includes the substeps of:

determining a representative point in each vector of an object whose display is changed;

determining a changed sample color for said representative point; and, changing the vector linearly at the ratios of an individual R,G,B component of said representative point and said sample color in said three-dimensional three-primary color space by giving said changed sample color to said representative point.

12. The color changing method according to claim 3, wherein said ambient color vector and input device bias vector changing step is executed by changing the length of the object color vector to be changed at a specified ratio.

13. The color changing method according to claim 2, wherein said texture vector is normal to a plane which is defined by said light source color vector and said object color vector.

14. The color changing method according to claim 2, wherein the step of presuming comprises:

presuming said light source color vector and said object color vector; and, presuming said bias vector or said bias vector and said color texture vector.

15. The color changing method according to claim 2, wherein said color changing step includes the substep of expressing and using a color vector C of an arbitrary picture element value in said three-primary color space by assuming that said arbitrary picture element value has positional coordinates of Ms, Mb and Md in the three-dimensional positional coordinates, which are defined by said light source color vector Cs, said object color vector Cb and said color texture vector Cd, $$C = M_s C_s + M_b C_b + M_d C_d + C_a + B$$

(wherein letters Ca and B designate an ambient color vector and an input device bias vector, respectively).

16. The color changing method according to claim 15, wherein said color changing step is executed by using the expression of said color vector C after either at least two of said light source color vector Cs, said object color vector Cb, said color texture vector Cd and said ambient color vector Ca have been changed sequentially and mutually-dependently or at least one of them has been changed independently.

17. The color changing method according to claim 2, wherein said color changing step includes the substep of expressing and using a color vector C of an arbitrary picture element value in said three-primary color space by assuming that said arbitrary picture element value has positional coordinates of Ms and Mb in the two-dimensional positional coordinates, which are defined by said light source color vector Cs and said object color vector Cb, $$C = MsCs + MbCb + Ca + B$$

(wherein letters Ca and B designate an ambient color vector and an input device bias vector, respectively).

18. The color changing method according to claim 17, wherein said color changing step is executed by using the expression of said color vector C after said light source color vector Cs, said object color vector Cb and said ambient color vector Ca have been changed sequentially and mutually-dependently or at least one of them has been changed independently.

19. The color changing method according to claim 2, wherein said vector changing step includes the substep of changing said light source color vector.

20. The color changing method according to claim 2, wherein the vector changing step includes the substeps of:
   extracting a pure object color vector by eliminating the influences of said light source color vector from said object color vector; and,
   changing the presumed vectors by using the extracted pure object color vector.

21. The color changing method according to claim 20, wherein said vector changing step includes the substep of changing said pure object color vector.

22. The color changing method according to claim 20, wherein said extracting step is executed by using a relation that an individual R,G,B component of said object color vector is a product of an individual R,G,B component of said light source color vector and an individual R,G,B component of said pure object color vector.

23. The color changing method according to claim 20, wherein said vector changing step includes the substeps of:
   changing said light source color vector and said pure object color vectors mutually-dependently or independently; and,
   generating an object color vector by using said light source color vector and said pure object color vector.

24. The color changing method according to claim 23, wherein said generating an object color vector step is executed by using a relation that an individual R,G,B component of said object color vector is the product of an individual R,G,B component of said light source color vector and an individual R,G,B component of said pure object color vector.

25. The color changing method according to claim 2, further comprising the steps of:
   plotting the individual picture element values of a model color image, which is placed in a predetermined ambient atmosphere, in said three-dimensional three-primary color space;
   presuming at least one of the bias vector which expresses the bias from the origin of said plotted data, the light source color vector, said object color vector and said color texture vector, which start from a point displaced from said origin by said bias vector; and,
   changing color of an object region in said model color image to have either its object color changed or said ambient atmosphere changed by using said presumed at least one vector.

26. The color changing method according to claim 25, wherein said ambient atmosphere changing step includes the substep of changing the light source color vector and a pure ambient color vector of said color image collectively or changing at least one of them independently by using the light source color vector and a pure ambient color vector either in plurality or individually of said model color image.

27. The color changing method according to claim 25, further comprising the steps of:
   adjusting at least one of the vectors presumed from said model image; and,
   changing either the object color or said ambient atmosphere of said color image by using at least one of the adjusted vectors.

28. The color changing method according to claim 27, wherein said vector changing step is executed by changing the length of the object color vector to be changed at a specified ratio.

29. The color changing method according to claim 2, wherein said vector changing step includes the substeps of:
   determining a representative point in each vector of an object whose display is changed;
   determining a changed sample color for said representative point; and,
   changing the vector linearly at the ratios of an individual R,G,B component of said representative point and said sample color in said three-dimensional three-primary color space by giving said changed sample color to said representative point.

30. The color changing method according to claim 2, wherein said vector changing step is executed by changing the length of a vector of the object whose display is changed at a specified ratio.

31. A color changing method for changing color on a display, the method comprising the steps of:
   inputting individual picture element values of a color image through an image input device;
   plotting the individual picture element values of the color image in a three-dimensional three-primary color space;
   displaying the three dimensional three-primary color space including the plotted individual picture element values of the color image;
   presuming at least two components, a light source color component which expresses specular reflection light, and an object color component which expresses diffuse reflection light, from among four components, including a bias component which expresses bias of said plotted data from an origin, said light source color component, said object color component and a color texture component which expresses distance between a picture element value and a plane which is defined by said light source color component and said object color component, determining positional coordinates of said picture element values in a three-dimensional space, which is defined by said light source color component, said object color component and said color texture component, or said plane, changing at least said light source color component among said four components;

accomplishing a color change in the color image by using the changed component or components and said positional coordinates; and, displaying the color image incorporating the color change on the display.

32. A color changing method for changing color on a display, the method comprising the steps of:

inputting individual picture element values of a color image through an image input device;

plotting the individual picture element values of the color image in a three-dimensional three-primary color space;

displaying the three dimensional three-primary color space including the plotted individual picture element values of the color image;

presuming from the plotted picture element values at least two vectors, an object color vector and a light source color vector, which start from a point displaced from an origin by a bias vector, from among four vectors, including the bias vector which expresses bias of said plotted data from an origin, said light source color vector, said object color vector and a color texture vector;

determining the positional coordinates of each of said picture element values in either a three-dimensional space, which is defined by said light source color vector, said object color vector and said color texture vector, or a plane which is defined by said light source color vector and said object color vector; changing at least said light source color vector;

accomplishing a color change of the color image by using said positional coordinates and said changed vector or vectors; and, displaying the color image incorporating the color change on the display.

33. The color changing method according to claim 32, wherein said vector changing step includes the substeps of:

determining a representative point in each vector of an object whose display is changed;

determining a changed sample color for said representative point; and, changing the vector linearly at the ratios of an individual R,G,B component of said representative point and said sample color in said three-dimensional three-primary color space by giving said changed sample color to said representative point.

34. The color changing method according to claim 32, wherein said vector changing step is executed by changing the length of the object color vector to be changed at a specified ratio.

35. A color changing method for changing color on a display, the method comprising the steps of:

inputting individual picture element values of a color image through an image input device;

plotting the individual picture element values of the color image in a three-dimensional three-primary color space;

displaying the three dimensional three-primary color space including the plotted individual picture element values of the color image;

presuming from the plotted picture element values at least two components, a light source color component which expresses specular reflection light, and an object color component which expresses diffuse reflection light from among four components, including a bias component which expresses bias of said plotted data from an origin, said light source color component, said object color component and a color texture component;

determining positional coordinates of each of said picture element values in a three-dimensional space, which is defined by said light source color component, said object color component and said color texture component, or a plane which is defined by said light source color component and said object color component;

extracting a pure object color vector by eliminating the influences of said light source color component from said object color component;

changing the presumed components collectively or changing at least one of them independently by using the extracted pure object color component;

accomplishing a color change of the color image by using said positional coordinates and the changed component or components; and, displaying the color image incorporating the color change on the display.

36. A color changing method for changing color on a display, the method comprising the steps of:

inputting individual picture element values of a color image through an image input device;

plotting the individual picture element values of the color image in a three-dimensional three-primary color space;

displaying the three dimensional three-primary color space including the plotted individual picture element values of the color image;

presuming from the plotted picture element values at least two vectors including a light source color vector, and an object color vector which start from a point displaced from an origin by a bias vector, from among four vectors including said bias vector which expresses bias of said plotted data from an origin, said light source color vector, said object color vector and a color texture vector;

determining positional coordinates of each of said picture element values in either a three-dimensional space, which is defined by said light source color vector, said object color vector and said color texture vector, or a plane which is defined by said light source color vector and said object color vector;

extracting a pure object color vector by eliminating the influences of said light source color vector from said object color vector;

changing the presumed vectors collectively or changing at least one of them independently on the display by using the extracted pure object color vector;

accomplishing a color change of the color image by using said positional coordinates and the changed vector or vectors; and, displaying the color image incorporating the color change on the display.

37. The color changing method according to claim 36, wherein said vector changing step includes the substep of changing said pure object color vector.

38. The color changing method according to claim 37, wherein said vector changing step includes the substeps of:
 determining a representative point in each object color vector to be changed;
 determining a changed sample color for said representative point; and,
 changing the vector linearly at the ratios of an individual R,G,B component of said representative point and said sample color in said three-dimensional three-primary color space by giving said changed sample color to said representative point.

39. The color changing method according to claim 37, wherein said vector changing step is executed by changing the length of the object color vector to be changed at a specified ratio.

40. The color changing method according to claim 36, wherein said extracting step is executed by using a relation that an individual R,G,B component of said object color vector is a product of an individual R,G,B component of said light source color vector and an individual R,G,B component of said pure object color vector.

41. The color changing method according to claim 36, wherein said vector changing step includes the substeps of:
 changing said light source color vector and said pure object color vector simultaneously or individually; and,
 generating an object color vector by using said light source color vector and said pure object color vector.

42. The color changing method according to claim 41, wherein said generating an object color vector step is executed by using a relation that an individual R,G,B component of said object color vector is a product of an individual R,G,B component said light source color vector and an individual R,G,B component of a pure object color vector.

43. A color changing method for changing color on a display, the method comprising the steps of:
 inputting individual picture element values of a color image through an image input device;
 plotting the individual picture element values of the color image to have its color changed in a three-dimensional three-primary color space;
 displaying the three dimensional three-primary color space including the plotted individual picture element values of the color image;
 presuming from the plotted picture element values at least two components, including a light source color component which expresses specular reflection light, and an object color component which expresses diffuse reflection light from among four components, including a bias component which expresses bias of said plotted picture element values from an origin, said light source color component, said object color component and a color texture component which expresses distance between a picture element value and a plane which is defined by said light source color component and said object color component;
 determining positional coordinates of each of said picture element values in a three-dimensional space, which is defined by said light source color component, said object color component and said color texture component, or a plane which is defined by said light source color component and said object color component;
 plotting the individual picture element values of a model color image which is placed in a predetermined ambient atmosphere, in said three-dimensional three-primary color space;
 presuming from the model color image plotted picture element values at least one of the four components, including the bias component which expresses the bias of said plotted data from said origin, the light source component which expresses specular reflection light, and the object color component which expresses diffuse reflection light and said color texture component which expresses the distance between a picture element value and a plane, which is defined by said light source color component and said object color component; and,
 changing color on the display of said color image to have either an object color changed or said ambient atmosphere changed from the components presumed from said model image and said positional coordinates.

44. A color changing method for changing color on a display, the method comprising the steps of:
 inputting individual picture element values of a color image through an image input device;
 plotting the individual picture element values of the color image to have its color changed in a three-dimensional three-primary color space;
 displaying the three dimensional three-primary color space including the plotted individual picture element values of the color image;
 presuming from the plotted picture element values at least two vectors, a light source color vector, and an object color vector which start from a point displaced from an origin by a bias vector which expresses the bias of said plotted data from an origin, from among four vectors, including said bias vector, said light source color vector, said object color vector and a color texture vector;
 determining positional coordinates of said picture element values in either the three-dimensional space, which is defined by said light source color vector, said object color vector and said color texture vector, or a plane which is defined by said light source color vector and said object color vector;
 plotting the individual picture elements of a model color image which is placed in a predetermined ambient atmosphere, in said three-dimensional three-primary color space;
 presuming from the plotted model image picture element values at least one of the four vectors, including the bias vector which expresses bias of said plotted data from said origin, the light source vector, said object color vector and said color texture vector, which start from a point displaced from the origin by said bias vector; and,
 changing the color of object region on the display in said color image to have either an object color changed or said ambient atmosphere changed from the vector or vectors presumed from said model image and said positional coordinates.

45. The color changing method according to claim 44, wherein said ambient atmosphere changing step includes the substep of changing the light source color vector and a pure ambient color vector collectively or changing at least one of them independently by using at least either of the light source color vector and a pure ambient color vector of said model color image.

46. The color changing method according to claim 44, further comprising the steps of:
    adjusting the vector or vectors presumed from said model image; and,
    changing either the object color or said ambient atmosphere of said color image by using the adjusted vector or vectors.

47. The color changing method according to claim 46, wherein said vector changing step is executed by changing the length of the object color vector to be changed at a specified ratio.

48. A color changing method for changing color on a display, the method comprising the steps of:
    inputting individual picture element values of a color image through an image input device;
    plotting the individual picture elements of the color image in a three-dimensional three-primary color space;
    displaying the three dimensional three-primary color space including the plotted individual picture element values of the color image;
    presuming from the plotted picture element values at least three components, including a light source color component which expresses specular reflection light, an object color component which expresses diffuse reflection light, and a color texture component which expresses the distance between a picture element value and a plane which is defined by said light source color component and said object color component, from among the following four components, a bias component which express the bias of said plotted data from an origin, said light source color component, said object color component and a color texture component;
    determining the positional coordinates of each of said picture element values in either a three-dimensional space, which is defined by said light source color vector, said object color component and said color texture component, or said plane;
    changing the presumed components collectively or changing at least one of them independently; and,
    accomplishing a color change on the display by using the changed component or components and said positional coordinates.

49. A color changing method for changing color on a display, the method comprising the steps of:
    inputting individual picture element values of a color image through an image input device;
    plotting the individual picture elements of the color image in a three-dimensional three-primary color space;
    presuming from the plotted picture element values at least three vectors, including a color texture vector, an object color vector and a light source color vector, which start from an origin among the following four vectors, a bias vector which expresses the bias of said plotted data from an origin, said light source color vector, said object color vector and said color texture vector;
    determining positional coordinates of each of said picture element values in either a three-dimensional space which is defined by said light source color vector, said object color vector and said color texture vector, or a plane which is defined by said light source color vector and said object color vector;
    changing the presumed vectors collectively or changing at least one of them independently; and,
    accomplishing a color change on the display by using the changed vector or vectors and said positional coordinates.

50. The color changing method according to claim 49, wherein said texture vector is normal to a plane which is defined by said light source color vector and said object color vector.

* * * * *

UNITED STATES PATENT AND TRADEMARK OFFICE
CERTIFICATE OF CORRECTION

PATENT NO. : 5,317,678
DATED : May 31, 1994
INVENTOR(S) : Hiroyuki Okawara, et al.

It is certified that error appears in the above-indentified patent and that said Letters Patent is hereby corrected as shown below:

Claim 2, column 27, line 15, after "space" delete ",".

Claim 35, column 32, line 14, before "a" insert --either--; and,
line 20, delete "vector" and substitute therefor --component--.

Claim 40, column 33, line 25, delete "said" and substitute therefor --a--.

Claim 43, column 33, line 59, before "bias" insert --the--; and,
line 62, delete "expresses" and substitute therefor --express--.

Claim 43, column 34, line 5, delete "element values" and substitute therefor --elements--.

Claim 48, column 35, line 20, delete "elements" and substitute therefor --element values--.

Claim 48, column 36, line 2, delete "vector" and substitute therefor --component--.

Claim 49, column 36, line 13, delete "elements" and substitute therefor --element values--; and,
line 16, delete "picture element"

Signed and Sealed this

Thirtieth Day of August, 1994

Attest:

BRUCE LEHMAN

*Attesting Officer*    *Commissioner of Patents and Trademarks*